(12) United States Patent
Cho et al.

(10) Patent No.: US 10,587,921 B2
(45) Date of Patent: Mar. 10, 2020

(54) VIEWER RATING CALCULATION SERVER, METHOD FOR CALCULATING VIEWER RATING, AND VIEWER RATING CALCULATION REMOTE APPARATUS

(71) Applicant: IPLATEIA INC., Seoul (KR)

(72) Inventors: Young Bong Cho, Seoul (KR); Ki Yeon Seo, Seoul (KR)

(73) Assignee: IPLATEIA INC., Seoul (KR)

( * ) Notice: Subject to any disclaimer, the term of this patent is extended or adjusted under 35 U.S.C. 154(b) by 0 days.

(21) Appl. No.: 15/819,009

(22) Filed: Nov. 21, 2017

(65) Prior Publication Data

US 2018/0098122 A1 Apr. 5, 2018

Related U.S. Application Data

(63) Continuation of application No. PCT/KR2016/013398, filed on Nov. 21, 2016.

(30) Foreign Application Priority Data

Jan. 8, 2016 (KR) .................. 10-2016-0002820

(51) Int. Cl.
*H04N 21/466* (2011.01)
*H04N 21/441* (2011.01)
(Continued)

(52) U.S. Cl.
CPC ..... *H04N 21/466* (2013.01); *H04N 21/25866* (2013.01); *H04N 21/4394* (2013.01);
(Continued)

(58) Field of Classification Search
None
See application file for complete search history.

(56) References Cited

U.S. PATENT DOCUMENTS 5,977,964 A * 11/1999 Williams .............. G11B 27/105
348/E17.005
6,298,482 B1 * 10/2001 Seidman ............ H04N 5/44543
348/E5.105
(Continued)

FOREIGN PATENT DOCUMENTS

CA    2756471 A1 * 4/2013
KR   1020020000288 A    1/2002
(Continued)

OTHER PUBLICATIONS

International Search Report of PCT/KR2016/013398 dated Feb. 9, 2017, 3 pages.

*Primary Examiner* — An Son P Huynh
(74) *Attorney, Agent, or Firm* — Hamre, Schumann, Mueller & Larson, P.C.

(57) ABSTRACT

According to an aspect of the present disclosure, a viewer rating calculation server includes a server communication unit configured to receive first audio feature information extracted by a viewer rating calculation remote apparatus from viewing contents, an audio feature information extraction unit configured to extract second audio feature information of a broadcast content received from at least one broadcast service provider, a viewing content identification unit configured to generate viewing information as a result of determination of a currently viewing content by comparing the first audio feature information with the second audio feature information, and a viewer rating calculation unit configured to calculate a viewer rating of each broadcast content in real time on the basis of multiple pieces of the viewing information.

14 Claims, 11 Drawing Sheets

(51) Int. Cl.
  *H04N 21/439* (2011.01)
  *H04N 21/442* (2011.01)
  *H04N 21/658* (2011.01)
  *H04N 21/258* (2011.01)

(52) U.S. Cl.
  CPC ..... *H04N 21/441* (2013.01); *H04N 21/44204* (2013.01); *H04N 21/44213* (2013.01); *H04N 21/44218* (2013.01); *H04N 21/44222* (2013.01); *H04N 21/6582* (2013.01)

(56) References Cited

U.S. PATENT DOCUMENTS

| | | | | |
|---|---|---|---|---|
| 7,962,935 | B2* | 6/2011 | Kurosaki | H04H 20/76 725/39 |
| 8,151,194 | B1* | 4/2012 | Chan | G06Q 30/0201 715/716 |
| 8,365,212 | B1* | 1/2013 | Orlowski | H04H 60/33 725/13 |
| 8,495,680 | B2* | 7/2013 | Bentolila | G06Q 30/0251 725/14 |
| 8,667,520 | B2* | 3/2014 | Bhatia | H04N 21/252 725/12 |
| 8,689,252 | B1* | 4/2014 | Rowe | G06Q 30/0251 725/32 |
| 8,745,647 | B1* | 6/2014 | Shin | H04N 21/442 725/10 |
| 8,769,589 | B2* | 7/2014 | Amento | G11B 27/034 725/86 |
| 8,799,945 | B2* | 8/2014 | Ozawa | H04N 5/44543 725/39 |
| 8,904,419 | B2* | 12/2014 | Vinson | H04N 21/44204 725/14 |
| 8,984,547 | B2* | 3/2015 | Lambert | H04H 60/45 725/10 |
| 9,055,311 | B1* | 6/2015 | Jayaram | G06F 16/24578 |
| 9,363,464 | B2* | 6/2016 | Alexander | H04N 5/775 |
| 9,451,308 | B1* | 9/2016 | Liu | H04N 21/26241 |
| 9,491,522 | B1* | 11/2016 | Trollope | H04N 21/8358 |
| 9,538,219 | B2* | 1/2017 | Sakata | H04N 17/04 |
| 9,544,650 | B1* | 1/2017 | Oztaskent | H04N 21/4394 |
| 9,736,503 | B1* | 8/2017 | Bakshi | H04N 21/23424 |
| 10,277,944 | B2* | 4/2019 | Venetucci | H04H 60/64 |
| 2002/0056087 | A1* | 5/2002 | Berezowski | G06Q 30/02 725/9 |
| 2002/0056107 | A1* | 5/2002 | Schlack | H04N 7/17318 725/46 |
| 2002/0077881 | A1* | 6/2002 | Krotki | G06Q 10/06 705/7.32 |
| 2003/0105870 | A1* | 6/2003 | Baum | G06Q 30/02 709/228 |
| 2003/0149988 | A1* | 8/2003 | Ellis | H04N 5/44543 725/87 |
| 2003/0221198 | A1* | 11/2003 | Sloo | H04N 5/4401 725/136 |
| 2004/0133906 | A1* | 7/2004 | Przybylek | H04H 60/40 725/9 |
| 2005/0138661 | A1 | 6/2005 | Matsukawa | |
| 2005/0149964 | A1* | 7/2005 | Thomas | G06Q 30/02 725/9 |
| 2006/0075429 | A1* | 4/2006 | Istvan | H04N 7/163 725/39 |
| 2007/0107008 | A1* | 5/2007 | Dybus | G06Q 30/02 725/9 |
| 2007/0124756 | A1* | 5/2007 | Covell | G06Q 30/02 725/18 |
| 2007/0136751 | A1* | 6/2007 | Garbow | H04N 7/173 725/46 |
| 2007/0136753 | A1* | 6/2007 | Bovenschulte | H04H 60/31 725/46 |
| 2007/0154163 | A1* | 7/2007 | Cordray | H04N 5/782 386/278 |
| 2007/0157281 | A1* | 7/2007 | Ellis | H04N 7/17309 725/134 |
| 2007/0240180 | A1* | 10/2007 | Shanks | H04H 60/31 725/14 |
| 2008/0082995 | A1* | 4/2008 | Tanaka | H04H 60/58 725/18 |
| 2008/0209474 | A1* | 8/2008 | Pjanovic | H04N 5/44543 725/46 |
| 2008/0271070 | A1* | 10/2008 | Kanojia | G06Q 30/0251 725/32 |
| 2008/0300965 | A1* | 12/2008 | Doe | G06Q 30/0204 705/7.33 |
| 2009/0030780 | A1* | 1/2009 | York | G06Q 30/02 705/14.41 |
| 2009/0060469 | A1* | 3/2009 | Olague | H04N 7/17318 386/297 |
| 2009/0319666 | A1* | 12/2009 | Liang | H04L 67/14 709/227 |
| 2010/0036854 | A1* | 2/2010 | Regan | H04N 5/76 725/105 |
| 2010/0161492 | A1* | 6/2010 | Harvey | G06Q 10/0639 705/50 |
| 2010/0251290 | A1* | 9/2010 | Kodialam | H04N 7/17318 725/34 |
| 2011/0072448 | A1* | 3/2011 | Stiers | H04N 7/17318 725/10 |
| 2011/0078172 | A1* | 3/2011 | LaJoie | G06F 16/64 707/769 |
| 2011/0145851 | A1* | 6/2011 | Lee | H04H 20/82 725/14 |
| 2012/0159528 | A1* | 6/2012 | Toney, Jr. | H04H 60/33 725/14 |
| 2012/0254911 | A1* | 10/2012 | Doe | H04N 21/25866 725/14 |
| 2013/0111514 | A1* | 5/2013 | Slavin | H04H 60/64 725/18 |
| 2013/0152116 | A1* | 6/2013 | Tsai | H04N 21/251 725/14 |
| 2013/0173765 | A1* | 7/2013 | Korbecki | H04N 21/42209 709/221 |
| 2013/0227086 | A1* | 8/2013 | Stout | H04L 67/36 709/219 |
| 2013/0268955 | A1* | 10/2013 | Conrad | H04N 21/252 725/12 |
| 2014/0053173 | A1* | 2/2014 | Oh | H04N 21/44218 725/12 |
| 2014/0068647 | A1* | 3/2014 | Nam | H04H 60/65 725/14 |
| 2014/0101688 | A1* | 4/2014 | Kim | H04N 21/24 725/18 |
| 2014/0108441 | A1* | 4/2014 | Samari | H04H 60/58 707/758 |
| 2014/0129570 | A1* | 5/2014 | Johnson | H04N 21/4126 707/748 |
| 2014/0130087 | A1* | 5/2014 | Cho | H04N 21/41407 725/34 |
| 2014/0254880 | A1* | 9/2014 | Srinivasan | G06K 9/00335 382/106 |
| 2014/0280603 | A1* | 9/2014 | Rideout | H04L 51/046 709/205 |
| 2014/0282660 | A1* | 9/2014 | Oztaskent | H04N 21/4828 725/18 |
| 2014/0316543 | A1* | 10/2014 | Sharma | G06F 3/1423 700/94 |
| 2015/0163558 | A1* | 6/2015 | Wheatley | G06F 16/743 725/12 |
| 2015/0186368 | A1* | 7/2015 | Zhang | H04N 21/4756 707/740 |
| 2015/0186511 | A1* | 7/2015 | Trollope | G06F 16/632 707/769 |
| 2015/0262201 | A1* | 9/2015 | Rao | G06Q 30/0201 705/7.29 |
| 2015/0350729 | A1* | 12/2015 | Reynolds | H04N 21/25891 725/34 |
| 2016/0037201 | A1* | 2/2016 | Kitts | H04N 21/2668 725/35 |

(56) References Cited

U.S. PATENT DOCUMENTS

| | | | |
|---|---|---|---|
| 2016/0050457 A1* | 2/2016 | Mondal | H04N 21/44204 725/18 |
| 2016/0086205 A1* | 3/2016 | Dove | H04L 67/306 705/7.32 |
| 2016/0171243 A1* | 6/2016 | Maeda | G06F 21/6254 726/27 |
| 2016/0249098 A1* | 8/2016 | Pecjak | H04N 21/44222 |
| 2017/0134803 A1* | 5/2017 | Shaw | H04N 21/4126 |

FOREIGN PATENT DOCUMENTS

| | | |
|---|---|---|
| KR | 100838674 B1 | 6/2008 |
| KR | 1020100000464 A | 1/2010 |
| KR | 1020130117092 A | 10/2013 |
| KR | 101369475 B1 | 3/2014 |

\* cited by examiner

FIG. 11

| | VIEWING TIME RATIO | LEAVE RATIO | DEGREE OF VIEWING CONCENTRATION | |
|---|---|---|---|---|
| CHANNEL A | 10% | 25% | 0.04 | HIGHER DEGREE OF VIEWING CONCENTRATION THAN ON CHANNEL B LOWER DEGREE OF VIEWING CONCENTRATION THAN ON CHANNEL C |
| CHANNEL B | 5% | 30% | 0.17 | LOWER DEGREE OF VIEWING CONCENTRATION THAN ON CHANNELS A AND C |
| CHANNEL C | 30% | 40% | 0.75 | HIGHER DEGREE OF VIEWING CONCENTRATION THAN ON CHANNELS A AND B |

VIEWER RATING CALCULATION SERVER, METHOD FOR CALCULATING VIEWER RATING, AND VIEWER RATING CALCULATION REMOTE APPARATUS

CROSS-REFERENCE TO RELATED APPLICATION

This application claims priority from Korean Patent Application No. 10-2016-0002820 filed on Jan. 8, 2016, in the Korean Intellectual Property Office, the disclosure of which is incorporated by reference herein in its entirety.

TECHNICAL FIELD

The present disclosure relates to a viewer rating calculation server, a method for calculating a viewer rating, and a viewer rating calculation remote apparatus and more particularly, to a viewer rating calculation server for calculating an accurate viewer rating, a method for calculating a viewer rating, and a viewer rating calculation remote apparatus.

BACKGROUND

Today, televisions (TVs) have been digitized gradually with the development of digital technology (existing analog televisions have been replaced with digital televisions), and on the one hand, a convergence of broadcasting and communication that provide content having different attributes through separate networks is accelerating. In other words, the initiative is shifted from unidirectional analog broadcasting to bi-directional digital broadcasting that interacts with the viewers. In addition, available methods that the viewers take advantage of the broadcast content are also diversified, inclusive of receiving the broadcast content through Digital Multimedia Broadcasting (DMB), the Internet, and the like.

Conventionally, there has been used a method of selecting a limited number of panels, installing a dedicated apparatus required for viewer rating calculation at home of each of the selected panels, and collecting daily data on channels viewed by the household to calculate a viewer rating. Particularly, the data relevant to the viewed channels are transmitted in a lump in a specific time zone (e.g., 4 a.m. to 5 a.m.) to a server that calculates a viewer rating, and, thus, it is impossible to calculate a viewer rating in real time.

Further, the viewer rating calculation apparatus installed at home cannot identify which of the household members is viewing a current channel and thus cannot calculate viewer rating data with high reliability. Further, data provided by the viewer rating calculation apparatus include only information about which channel is viewed among channels broadcast in real time, and, thus, viewing of VOD (Video On Demand) cannot be included in the viewer rating data.

DISCLOSURE OF THE INVENTION

Problems to be Solved by the Invention

The present disclosure is conceived to solve the above-described problem and provides a viewer rating calculation server capable of providing a more accurate and practical viewer rating in real time, a method for calculating a viewer rating, and a viewer rating calculation remote apparatus.

Means for Solving the Problems

A viewer rating calculation server may include a server communication unit configured to receive first audio feature information extracted by a viewer rating calculation remote apparatus from viewing contents, an audio feature information extraction unit configured to extract second audio feature information of a broadcast content received from at least one broadcast service provider, a viewing content identification unit configured to generate viewing information as a result of determination of a currently viewing content by comparing the first audio feature information with the second audio feature information, and a viewer rating calculation unit configured to calculate a viewer rating of each broadcast content in real time on the basis of multiple pieces of viewing information.

Effects of the Invention

According to a viewer rating calculation server, a method for calculating a viewer rating, and a viewer rating calculation remote apparatus in accordance with exemplary embodiments of the present disclosure, it is possible to provide a more accurate and practical viewer rating in real time.

BRIEF DESCRIPTION OF THE DRAWINGS

FIG. 11 is a diagram provided to explain an exemplary embodiment for calculating the degree of viewing concentration.

BEST MODE FOR CARRYING OUT THE INVENTION

Figure 1:
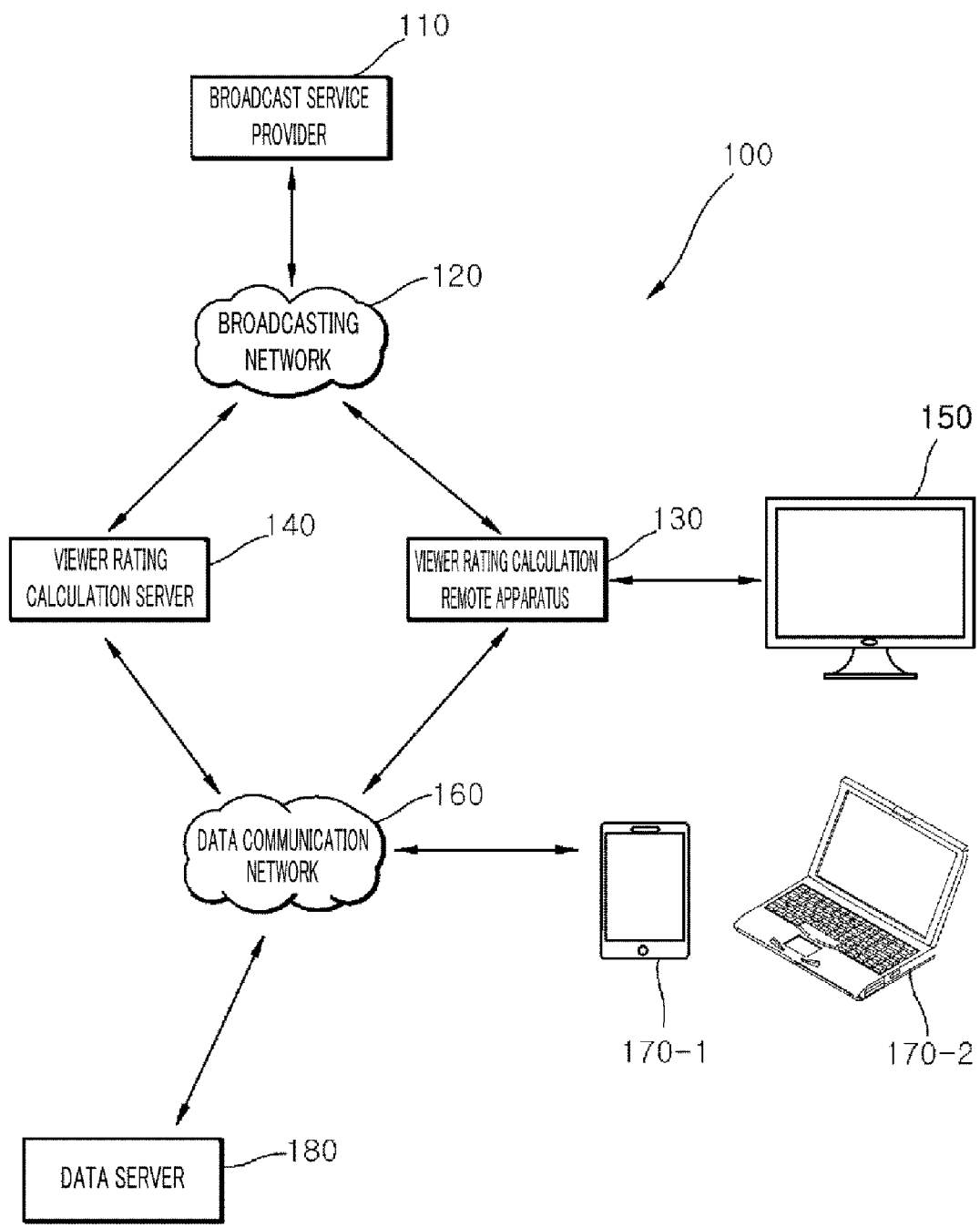
FIG. 1 is a schematic configuration view of a viewer rating calculation system according to an exemplary embodiment of the present disclosure.

According to an aspect of the present disclosure, a viewer rating calculation server may include a server communication unit configured to receive first audio feature information extracted by a viewer rating calculation remote apparatus from viewing contents, an audio feature information extraction unit configured to extract second audio feature information of a broadcast content received from at least one broadcast service provider, a viewing content identification unit configured to generate viewing information as a result of determination of a currently viewing content by comparing the first audio feature information with the second audio feature information, and a viewer rating calculation unit configured to calculate a viewer rating of each broadcast content in real time on the basis of multiple pieces of the viewing information.

According to an exemplary embodiment, the viewer rating calculation server may further include a database unit including a real-time broadcast database configured to store second audio feature information of a broadcast content which is currently broadcast and a VOD broadcast database configured to store second audio feature information of a broadcast content which is already ended.

According to an exemplary embodiment, the viewing content identification unit may compare the first audio feature information with the second audio feature information stored in the real-time broadcast database, and if the first audio feature information is identical to the second audio feature information stored in the real-time broadcast database, the viewing content identification unit may determine a broadcast content corresponding to the identical second audio feature information as a currently viewing content.

According to an exemplary embodiment, if the first audio feature information is not identical to the second audio feature information stored in the real-time broadcast database, the viewing content identification unit may compare the first audio feature information with the second audio feature information stored in the VOD broadcast database and determine a broadcast content corresponding to the identical second audio feature information as a currently viewing content.

According to an exemplary embodiment, the second audio feature information compared with the first audio feature information may be second audio feature information stored before a predetermined time.

According to an exemplary embodiment, the viewer rating calculation unit may generate statistics for the viewer rating by reflecting panel information about a panel's personal details received from the viewer rating calculation remote apparatus.

According to an exemplary embodiment, the viewer rating calculation unit may generate statistics for the viewer rating by reflecting previously stored panel information about a panel's personal details, and the panel information may be information received from a user device corresponding to the viewer rating calculation remote apparatus.

According to an exemplary embodiment, the viewer rating calculation unit may calculate a panel reactivity on the basis of panel reaction information including audio data or video data collected through the viewer rating calculation remote apparatus or a user device corresponding thereto.

According to another aspect of the present disclosure, a method for calculating a viewer rating may include receiving, by a server communication unit, first audio feature information extracted by a viewer rating calculation remote apparatus from viewing contents, extracting, by an audio feature information extraction unit, second audio feature information of a broadcast content received from at least one broadcast service provider, generating, by a viewing content identification unit, viewing information as a result of determination of a currently viewing content by comparing the first audio feature information with the second audio feature information, and calculating, by a viewer rating calculation unit, a viewer rating of each broadcast content in real time on the basis of multiple pieces of the viewing information.

According to an exemplary embodiment, the method for calculating a viewer rating may further include storing second audio feature information of a broadcast content which is currently broadcast in a real-time broadcast database and storing second audio feature information of a broadcast content which is already ended in a VOD broadcast database.

According to an exemplary embodiment, the generating of viewing information may include comparing the first audio feature information with the second audio feature information stored in the real-time broadcast database, and if the first audio feature information is identical to the second audio feature information stored in the real-time broadcast database as a result of the comparison, the generating of viewing information may include determining a broadcast content corresponding to the identical second audio feature information as a currently viewing content.

According to an exemplary embodiment, if the first audio feature information is not identical to the second audio feature information stored in the real-time broadcast database, the generating of viewing information may include comparing the first audio feature information with the second audio feature information stored in the VOD broadcast database and determining a broadcast content corresponding to the identical second audio feature information as a currently viewing content.

According to an exemplary embodiment, the comparing of the first audio feature information with the second audio feature information may include comparing the first audio feature information with second audio feature information stored before a predetermined time.

According to an exemplary embodiment, the calculating of a viewer rating in real time may include generating statistics for the viewer rating by reflecting panel information about a panel's personal details received from the viewer rating calculation remote apparatus.

According to an exemplary embodiment, the calculating of a viewer rating in real time may include generating statistics for the viewer rating by reflecting previously stored panel information about a panel's personal details, and the panel information may be received from a user device corresponding to the viewer rating calculation remote apparatus.

According to an exemplary embodiment, the method for calculating a viewer rating may further include calculating a panel reactivity, and the panel reactivity is an index indicating the degree of reaction of panels to a viewed channel or program and is calculated on the basis of panel reaction information including audio data or video data generated from a viewer's reaction to a viewing content and collected through the viewer rating calculation remote apparatus or a user device corresponding to the viewer rating calculation remote apparatus.

According to yet another aspect of the present disclosure, a viewer rating calculation remote apparatus may include an audio data extractor configured to collect audio generated by a viewing content and extract first audio feature information, a data communication circuit configured to transmit the first audio feature information to a viewer rating calculation server in order to calculate a viewer rating of each broadcast content in real time on the basis of a result of comparison between the first audio feature information with second audio feature information of the broadcast content, and a controller configured to control operations of the audio data extractor and the data communication circuit.

According to an exemplary embodiment, the audio data extractor may collect the audio through a microphone or an audio device and extract the second audio feature information.

According to an exemplary embodiment, if a user device of a panel satisfies non-use conditions, the controller may transmit a notification message to determine whether or not the panel views the content.

According to an exemplary embodiment, the controller may use a signal power level of a user device of a panel to determine whether or not the panel views the content.

According to an exemplary embodiment, if it is determined that the panel does not view the content, the controller may control the data communication circuit not to transmit the first audio feature information.

According to an exemplary embodiment, the controller may use a signal power level of a user device of at least one panel to determine a panel who is viewing the content and generate panel information about personal details of the panel who is viewing the content.

According to an exemplary embodiment, the viewer rating calculation remote apparatus may collect panel reaction information through a microphone, a camera, or other sensors, and the data communication circuit may transmit the panel reaction information.

According to an exemplary embodiment, the panel reaction information may include at least one of reactions of a panel who is viewing the content including the volume of a sound, the kind of a sound, the number of sounds, and the kind of a movement.

According to an exemplary embodiment, the controller may use a signal power level of a user device of at least one panel to determine the number of panels who are viewing the content, and the data communication circuit may transmit information about the determined number of panels as the panel reaction information.

According to an exemplary embodiment, the viewer rating calculation remote apparatus may transfer a viewing notification message to a user device on the basis of a panel's viewing pattern received from the viewer rating calculation server.

MODE FOR CARRYING OUT THE INVENTION

The present disclosure may have various modifications imposed thereto and implemented in various embodiments, and thus particular embodiments will be illustrated in the drawings and will be described in detail in the best mode. However, it should be understood that the present disclosure is not intended to limit to those particular embodiments, and the present disclosure may encompass any modifications, equivalents, and alternatives embraced by the spirit and the technical scope of the present disclosure. In the following description, well-known functions or constitutions will not be described in detail if they would unnecessarily obscure the embodiments of the invention.

The terms of a first, a second, etc. can be used to describe different components, but the components should not be limited by their terminologies. The above terms are merely used for the purpose of distinguishing one component from the other components.

The terms used herein are employed only to describe specific embodiments, but are not intended to limit the present disclosure thereto. The representation of the singular, unless it clearly indicates in the context otherwise, includes multiple representations. In the present application, it should be understood that the terms "includes or comprises" or "has", and variants thereof are used to specify the presence of features, figures, steps, operations, components, elements, or combination thereof listed herein, but are not intended to exclude the possibility of presence or supplement of one or more pieces of the features, figures, steps, operations, components, elements, or combination thereof. Hereinafter, the embodiments of the present disclosure will be described in detail with reference to the accompanying drawings.

In the following description, the term "viewer rating" refers to a ratio calculated to show how many people view a specific program being broadcast on TV and can be calculated by various methods as follows. For example, it is possible to calculate a viewer rating in various manners such as a household TV viewer rating calculated using a ratio of the number of households viewing TV to the total number of households having TV (the number of households viewing TV/the total number of households having TV), a household viewer rating per channel calculated using a ratio of the number of households viewing a specific channel to the total number of households having TV (the number of households viewing a specific channel/the total number of households having TV), a share calculated using a ratio of the number of households viewing a specific channel to the number of households viewing TV (the number of households viewing a specific channel/the number of households viewing TV), and a personal viewer rating calculated using a ratio of the number of viewers viewing a specific channel to the total number of users having TV (the number of viewers viewing a specific channel/the total number of users having TV).

FIG. 1 is a schematic configuration view of a viewer rating calculation system in accordance with an exemplary embodiment of the present disclosure.

Referring to FIG. 1, a viewer rating calculation system 100 includes a broadcast service provider 110, a broadcasting network 120, a viewer rating calculation remote apparatus 130, a viewer rating calculation server 140, a television 150, a data communication network 160, a user device such as a smart phone 170-1, a notebook computer 170-2, etc. (hereinafter, collectively denoted by 170-m, where m is a natural number), and a data server 180.

Herein, the broadcast service provider 110 may be connected to the viewer rating calculation remote apparatus 130 and/or the viewer rating calculation server 140 through the broadcasting network 120. Further, the viewer rating calculation remote apparatus 130, the viewer rating calculation server 140, the user device 170-m, and the data server 180 are connected to each other through the data communication network 160.

That is, the broadcast service provider 110 may transmit a broadcast content to the viewer rating calculation remote apparatus 130 and/or the viewer rating calculation server 140 through the broadcasting network 120 such as a satellite, a ground wave, the Internet, a cable, or the like. That is, the broadcast content collectively means audio and/or video that are distributed through a broadcasting medium such as a satellite, a ground wave, a cable, or the like, and the broadcasting network 120 means a network through which the broadcast content from the broadcast service provider 110 can be transmitted to the viewer rating calculation remote apparatus 130 and/or the viewer rating calculation server 140.

The viewer rating calculation remote apparatus 130 may be a device wiredly and/or wirelessly connected to a set-top box (a device configured to receive a broadcast content from the broadcast service provider 110) (not illustrated) and configured to receive an audio signal of the broadcast content from the set-top box (not illustrated). According to another exemplary embodiment, the viewer rating calculation remote apparatus 130 may be a device (e.g., a smart phone) configured to receive audio generated from a broadcast content being broadcast or played on the television 150 connected to the set-top box in the form of an audio signal of the broadcast content through a microphone. According to yet another exemplary embodiment, the viewer rating calculation remote apparatus 130 may be a device such as a set-top box, a mobile phone (e.g., a smart phone), a personal computer (PC), etc. configured to receive a broadcast content from the broadcast service provider 110.

That is, the viewer rating calculation remote apparatus 130 may refer to a comprehensive device which can perform functions to be described with reference to FIG. 3 and in which an application for performing these functions can be installed.

The viewer rating calculation remote apparatus 130 may generate first audio feature information by collecting audio generated from a broadcast content on the television 150 at home. The first audio feature information may be information about features of audio of the broadcast content and may be, e.g., an audio fingerprint. Herein, a broadcast content to be viewed through the TV at home is defined as a viewing content. The viewer rating calculation remote apparatus 130 may generate the first audio feature information and then transmit the first audio feature information to the viewer rating calculation server 140 according to a predetermined method and when transmitting the first audio feature information, the viewer rating calculation remote apparatus 130 may also transmit panel information and/or weighting information. Details of the panel information and/or weighting information will be described later.

The television 150 may receive the viewing content directly from the broadcast service provider 110 or receive the viewing content from the set-top box (not illustrated) and then provide video and audio of the viewing content.

When a broadcast content is received from the broadcast service provider 110, the viewer rating calculation server 140 may extract second audio feature information of the broadcast content and store the second audio feature information in a predetermined storage space according to a predetermined method. The second audio feature information, like the first audio feature information, may be information about features of audio of the broadcast content and may be, e.g., an audio fingerprint. Further, the first audio feature information and the second audio feature information may be generated by the same method.

In addition, the viewer rating calculation server 140 may receive the first audio feature information through the data communication network 160 and calculate a viewer rating of each broadcast content in real time by comparing the first audio feature information with the second audio feature information.

Here, the data communication network 160 refers to a network through which data can be provided to the user device 170-*m* and may include the Internet, a mobile network, an intranet, and the like.

Further, when the user device 170-*m* receives a notification message from the viewer rating calculation remote apparatus 130 through a local area network (not illustrated), the user device 170-*m* may display the notification message. The notification message may be a message for checking whether a panel as a user of the user device 170-*m* is positioned adjacent to the user device 170-*m*. Therefore, the viewer rating calculation remote apparatus 130 may use the user device 170-*m* to verify whether the panel as the user of the user device 170-*m* is actually viewing the viewing content through the television 150. Herein, the user device 170-*m* may be a smart phone, a mobile phone, a tablet computer, a PDA (Personal Digital Assistant), a personal computer (PC), and the like. Further, the local area network (not illustrated) refers to a communication network through which devices at a short distance can transmit and receive data with each other and may use a communication protocol such as Bluetooth, ZigBee, Wi-Fi, or the like.

Meanwhile, there has been described an example where the user device 170-*m* receives the notification message from the viewer rating calculation remote apparatus 130 through the local area network, but the user device 170-*m* may receive the notification message from the viewer rating calculation server 140. For example, the viewer rating calculation server 140 may previously recognize that the user device 170-*m* and the viewer rating calculation remote apparatus 130 are connected to each other. In general, the viewer rating calculation remote apparatus 130 is connected to the in-house television 150. Therefore, information (e.g., telephone number, user name, gender, age, etc.) about the user device 170-*m* of a user (e.g., family member, etc.) using the in-house television 150 may be previously stored in the viewer rating calculation server 140 since the user device 170-*m* is connected to the viewer rating calculation remote apparatus 130.

Then, when the viewer rating calculation server 140 receives first audio feature information or the like from the viewer rating calculation remote apparatus 130, the viewer rating calculation server 140 may generate a notification message and transmit the notification message to the user device 170-*m* connected to the viewer rating calculation remote apparatus 130. When the user device 170-*m* receives the notification message, the user device 170-*m* may display the notification message, or if the user performs an operation, such as a touch, in response to the notification message, the user device 170-*m* may transmit information about the operation to the viewer rating calculation server 140. As described above, the user device 170-*m* may be connected to the viewer rating calculation remote apparatus 130 through the local area network or the viewer rating calculation server 140.

The data server 180 refers to a server that provides data corresponding to a request of the user device 170-*m* connected thereto.

As described above, the viewer rating calculation server 140 may extract second audio feature information of a broadcast content received from the broadcast service provider 110 and store the second audio feature information, and may determine which broadcast content a user is viewing by using first audio feature information and/or second audio feature information received from the viewer rating calculation remote apparatus 130, and may also calculate a viewer rating of each broadcast content in real time. Hereinafter, specific operations of the viewer rating calculation server 140 and the viewer rating calculation remote apparatus 130 will be described with reference to FIG. 2 and FIG. 3.

Figure 2:
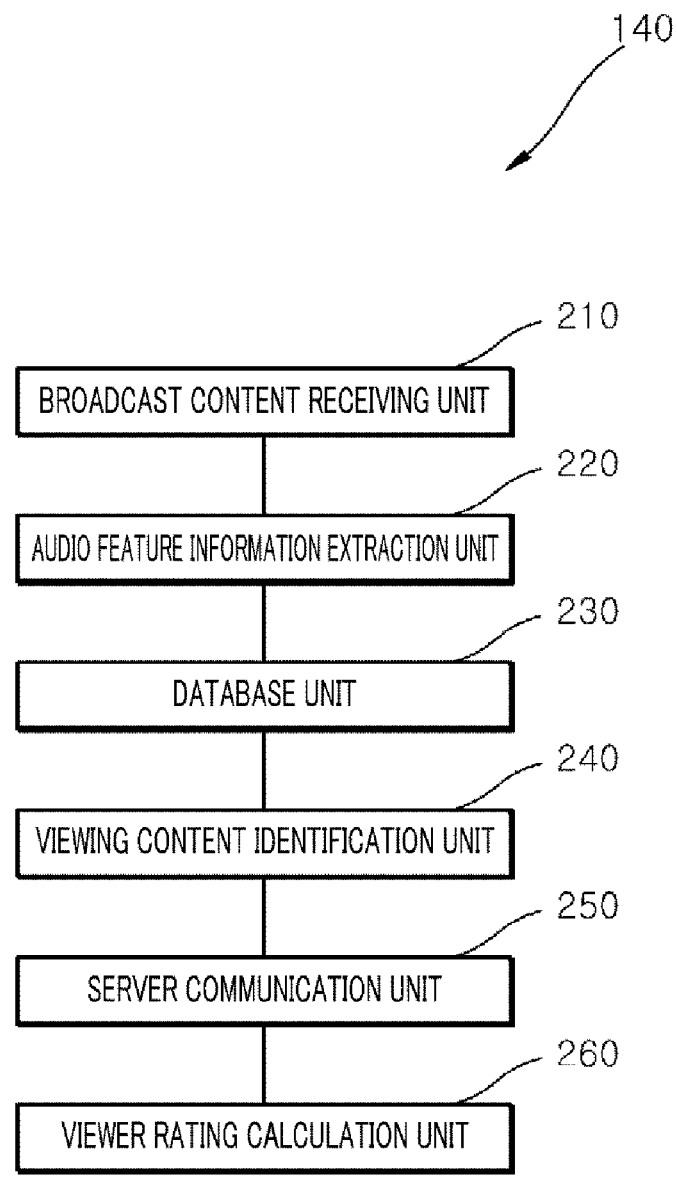
FIG. 2 is a block diagram of a viewer rating calculation server according to an exemplary embodiment of the present disclosure.
Figure 3:
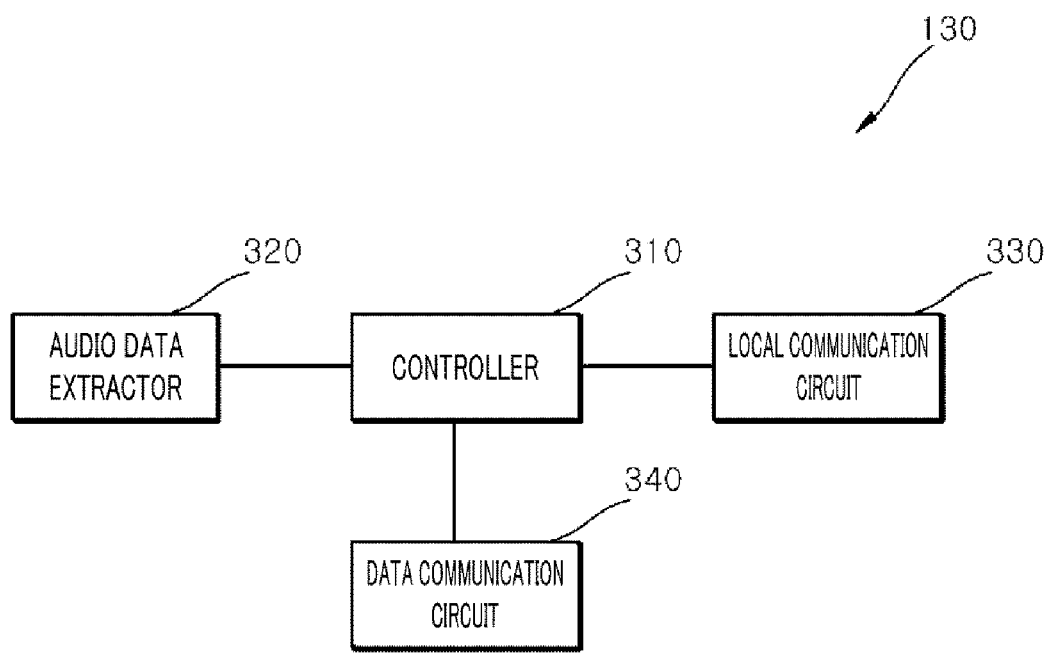
FIG. 3 is a block diagram of a viewer rating calculation remote apparatus according to an exemplary embodiment of the present disclosure.

FIG. 2 is a block diagram of a viewer rating calculation server according to an exemplary embodiment of the present disclosure, and FIG. 3 is a block diagram of a viewer rating calculation remote apparatus according to an exemplary embodiment of the present disclosure.

Referring to FIG. 2, the viewer rating calculation server 140 includes a broadcast content receiving unit 210, an audio feature information extraction unit 220, a database unit 230, a viewing content identification unit 240, a server communication unit 250, and a viewer rating calculation unit 260. Further, referring to FIG. 3, the viewer rating calculation remote apparatus 130 includes a controller 310, an audio data extractor 320, a local communication circuit 330, and a data communication circuit 350.

First, the broadcast content receiving unit 210 receives a broadcast content from the broadcast service provider 110 that is connected via the broadcasting network 120 and outputs the broadcast content to the audio feature information extraction unit 220. Herein, the broadcast content receiving unit 210 may include a set-top box, and the set-top boxe may be provided as the number of the broadcast channels through which the broadcast content is transmitted. For example, if the number of TV channels is 100 at present (i.e., if the number of broadcast content providers (for example, PPs (Program Providers) such as CNN, NBC, etc.) is 100), the broadcast content receiving unit 210 may have 100 set-top boxes. This is to simultaneously receive all broadcast contents which are broadcast at the same time.

Further, the broadcast content receiving unit 210 may receive the broadcast content through an antenna or a cable. Furthermore, the broadcast content receiving unit 210 may be provided with the broadcast content from an external storage medium (other storage medium such as USB, external hard disk, Internet server, and the like). As described above, the broadcast content receiving unit 210 may receive the broadcast content through various routes, and the routes of input of the broadcast content into the viewer rating calculation server 140 cannot the scope of the present disclosure.

Then, the audio feature information extraction unit 220 may extract second audio feature information according to a predetermined method by using the received broadcast content. That is, the audio feature information extraction unit 220 may extract audio feature information corresponding to each broadcast content from audio included in the broadcast content according to a predetermined method. For example, the audio feature information extraction unit 220 may extract audio feature information by extracting information about frequency components of audio of sequentially received broadcast contents according to a predetermined method. Herein, the operation of extracting the second audio feature information by the audio feature information extraction unit 220 is known to those skilled in the art, and, thus, its detailed description will be omitted.

The database unit 230 may include a real-time broadcast database configured to store second audio feature information of a broadcast content which is currently broadcast and a VOD broadcast database configured to store second audio feature information of a broadcast content which is already ended. That is, second audio feature information of each broadcast content which is currently broadcast may be stored in the real-time broadcast database in real time, and second audio feature information of each broadcast content which is already ended may be stored in the VOD broadcast database.

According to an exemplary embodiment, if a certain broadcast content input from the broadcast content receiving unit 210 has also been received in the past, the audio feature information extraction unit 220 does not newly generate second audio feature information of the broadcast content and enables second audio feature information of the broadcast content stored in the VOD broadcast database to be provided to the viewing content identification unit 240. This is because if data corresponding to extracted second audio feature information are previously stored in the database unit 230, the second audio feature information does not need to be stored again in the database unit 230. Further, it is obvious that the audio feature information extraction unit 220 may not extract feature information of the broadcast content until the broadcast content is ended. Herein, the end time of the broadcast content may be input by an operator of the viewer rating calculation server 140 or included in the received (digital) broadcast content.

For example, the audio feature information extraction unit 220 may extract an audio frame from audio data of the received broadcast content and extract second audio feature information from the extracted audio frame according to a predetermined method, and if information identical to the extracted second audio feature information is previously stored in the database unit 230, the audio feature information extraction unit 220 may not extract second audio feature information of the broadcast content any more. Further, the audio feature information extraction unit 220 may use a broadcast end time included in an input broadcast content or input by the operator and extract again second audio feature information of a broadcast content which is input after the broadcast end time.

In this case, the viewer rating calculation remote apparatus 130 (particularly, the audio data extractor 320) may process audio of a viewing content obtained through a microphone or an audio device according to the same method as the method of extracting second audio feature information by the audio feature information extraction unit 220 and then generate first audio feature information.

Meanwhile, the viewing content identification unit 240 may determine a content being currently output on the television 150 corresponding to the viewer rating calculation remote apparatus 130 by comparing first audio feature information received from the viewer rating calculation remote apparatus 130 with second audio feature information previously stored in the database unit 230. Further, it is obvious that the first audio feature information may further include personal information of the user (e.g., login information used for access of the viewer rating calculation remote apparatus 130 to the viewer rating calculation server 140) (or the personal information may also be transmitted separately from the first audio feature information).

The viewing content identification unit 240 may generate viewing information which is a result of the determination of a currently viewing content. The viewing information may include personal information of the user of the viewer rating calculation remote apparatus 130, time information, channel information of the broadcast content (i.e., information about a name of a program provider, such as NBC, CNN, etc.), title information of the broadcast content (i.e., information about a title of the broadcast content, such as CNN News, etc.), and the like.

The viewing content identification unit 240 may transfer panel information received through the server communication unit 250 and/or weighting information calculated on the basis of the panel information to the viewer rating calculation unit 260 together with the viewing information. According to another exemplary embodiment, the viewer rating calculation unit 260 may receive the panel information and/or weighting information directly form the server communication unit 250. Besides, the degree of viewing concentration or panel reaction information and/or panel reactivity to be described later may be transmitted to the viewer rating calculation unit 260.

The viewing content identification unit 240 may compare first audio feature information with second audio feature information which is stored in the real-time broadcast database before a predetermined time, and if the first audio feature information is identical to any one piece of the second audio feature information stored in the real-time broadcast database, the viewing content identification unit 240 may determine a broadcast content corresponding to the identical second audio feature information as a currently viewing content. For example, it is assumed that first audio feature information is extracted from a viewing content of on-air Channel 32 and then input into the viewing content identification unit 240. In this case, the viewing content identification unit 240 may compare the received first audio feature information with second audio feature information which is stored before a predetermined time (e.g., 10 seconds) among second audio feature information of each of 100 on-air channels stored in the real-time broadcast database. As a result of the comparison, the viewing content identification unit 240 can identify second audio feature information corresponding to the first audio feature information and may determine a broadcast content corresponding to the identified second audio feature information as a currently viewing content (i.e., a broadcast content being broadcast on Channel 32).

In this case, the predetermined time may be previously determined considering the time required for extraction of first audio feature information by the viewer rating calculation remote apparatus 130 and transfer by the viewing content identification unit 240. Herein, if first audio feature information is identical to second audio feature information stored in the real-time broadcast database (i.e., corresponding to Channel 32), the viewing content identification unit 240 may determine Channel 32 as a currently viewing channel.

If first audio feature information is not identical to second audio feature information stored in the real-time broadcast database, the viewing content identification unit 240 may compare the first audio feature information with second audio feature information stored in the VOD broadcast database and determine a broadcast content corresponding to the identical second audio feature information as a currently viewing content.

For example, it is assumed that first audio feature information is extracted from a viewing content of "9 o'clock News dated May 1, 2015" played through a "TV Replay" or "VOD" service among already ended contents. In this case, the viewing content identification unit 240 cannot detect second audio feature information identical to the first audio feature information by comparing the first audio feature information with second audio feature information which is stored before a predetermined time among second audio feature information of each of 100 on-air channels stored in the real-time broadcast database.

In this case, the viewing content identification unit 240 may compare the first audio feature information with second audio feature information stored in the VOD broadcast database and then determine the broadcast content (9 o'clock News dated May 1, 2015) corresponding to the identical second audio feature information as a currently viewing content. In this case, second audio feature information searched from the VOD broadcast database may be searched sequentially from the current date to past dates, or may be searched considering a viewing tendency (e.g., tendency to view dramas and entertainment shows in sequence) of the viewer rating calculation remote apparatus 130 (in order of dramas, entertainment shows, and others in the VOD broadcast database) to increase the search efficiency, but the scope of the present disclosure is not limited thereto.

Meanwhile, the viewer rating calculation unit 260 may calculate a viewer rating of each broadcast content in real time on the basis of viewing information generated from first audio feature information received from multiple viewer rating calculation remote apparatuses 130. That is, the viewer rating calculation unit 260 may detect the number of viewer rating calculation remote apparatuses 130 (hereinafter, referred to as "number of viewers") that transmit first audio feature information corresponding to broadcast content information. The viewer rating calculation unit 260 may divide the detected number of viewers by the total number of viewer rating calculation remote apparatuses 130 (hereinafter, referred to "total number of users") that currently transmit first audio feature information to the viewer rating calculation server 140 and thus calculate a real-time viewer rating corresponding to the broadcast content information.

For example, it is assumed that 100 broadcast contents are broadcast at the same time. In this case, it is assumed that the number of viewer rating calculation remote apparatuses 130 that transmit first audio feature information corresponding to any one of the 100 broadcast contents is A (where, A is a natural number). Further, it is assumed that the total number of viewer rating calculation remote apparatuses 130 that transmit first audio feature information is B (where, B is a natural number). In this case, a real-time viewer rating of the corresponding broadcast content can be calculated by dividing A by B. The real-time viewer rating can also be converted into an average viewer rating for each specific broadcast content (i.e., an average viewer rating for broadcasting hours of 70 minutes).

Further, if viewing information corresponding to a specific viewer rating calculation remote apparatus 130 corresponds to a viewing content using the VOD service, the viewer rating calculation remote apparatus 130 may be excluded from the number of users (N) and the viewing information may be used to calculate a cumulative viewer rating of the viewing content for a predetermined period (e.g., 1 month).

The viewer rating calculation unit 260 may calculate a panel reactivity on the basis of panel reaction information collected through the viewer rating calculation remote apparatus 130. Herein, the panel reaction information is generated from reactions of the viewer to the viewing content and may include audio data or video data and may be collected through a microphone, a camera, or other sensors combined with the viewer rating calculation remote apparatus 130. For example, if there are multiple panels viewing a TV broadcast content, when audio data including sounds of laughter or clapping of the panels or video data including movements of the panels are received, a panel reactivity can be calculated using the received audio or video data.

Otherwise, the viewer rating calculation unit 260 may also receive panel reaction information from the user device 170-$m$ connected to the viewer rating calculation remote apparatus 130. As described above with reference to FIG. 1, the viewer rating calculation remote apparatus 130 and the user device 170-$m$ may be connected to each other through the viewer rating calculation server 140. Further, the viewer rating calculation unit 260 may identify a viewing content being currently viewed by the user of the user device 170-$m$ by using first audio feature information received from the viewer rating calculation remote apparatus 130. Therefore, the viewer rating calculation unit 260 may calculate a panel reactivity of a specific channel or program by using the panel reaction information received from the user device 170-$m$ and the viewing information.

Furthermore, the viewer rating calculation unit 260 may generate statistics for a viewer rating by reflecting panel information about a panel's personal details (e.g., information about age, gender, home region, income level, and residence type of a panel) received from the viewer rating calculation remote apparatus 130. That is, the viewer rating calculation unit 260 may generate not only a simple viewer rating but also statistics for a viewer rating depending on specific personal criteria such as age, gender, region, and the like by using the panel information. For example, the viewer rating calculation unit 260 may generate various kinds of viewer rating data additionally considering the panel information. Viewing information can be classified by age, gender, or region in the panel information, and viewer ratings by age, viewer ratings by gender, or viewer ratings by region can be calculated. Further, a viewer rating can be calculated depending on a broadcast content subscription type of a panel such as a public channel subscriber, a cable channel subscriber, an IPTV subscriber, and the like.

Further, the viewer rating calculation unit 260 may give a weighting to a viewer rating on the basis of the panel information. In order to generate viewer rating information, panels to serve as samples are collected. The panels are collected according to demographic ratios by applying various classification criteria such as age, gender, home region, income level, residence type, and the like. For example, if the demographic ratio of people in their 20s is 20% and the demographic ratio of people in their 30s is 25% according to demographic data in terms of age, panels are collected according to this population ratio. However, when panels are actually collected, such demographic ratios may not be satisfied in many cases, and in such a case, weightings are appropriately applied to each classification to calculate a viewer rating. For example, if the ratio of people in their 20s is 20% but the ratio of actually collected panels in their 20s is 10%, viewing information of the panels in their 20s may be weighted two times, and thus, the viewing information of the panels in their 20s accounting for 10% functions as viewing information of the panels in their 20s accounting for 20%. Further, if the ratio of people in their 30s is 25% but the ratio of actually collected panels in their 30s is 30%, viewing information of the panels in their 30s may be weighted 25/30, and thus, the viewing information of the panels in their 30s accounting for 30% functions as viewing information of the panels in their 30s accounting for 25%. As such, if a ratio of the number of panels constituting each panel group classified by a predetermined classification criterion and the total number of panels does not match with a demographic ratio corresponding to the classification criterion, the viewer rating calculation unit 260 may give a weighting for compensating for a difference to each panel group to calculate a viewer rating on the basis of panel information and thus improve the accuracy in calculating of a viewer rating.

Meanwhile, there has been described an example where the panel information is received from the viewer rating calculation remote apparatus 130, but the panel information may be received directly from the user device 170-*m* or previously stored in the viewer rating calculation server 140. For example, each panel information may be matched with identification information of the viewer rating calculation remote apparatus 130 or identification information of the user device 170-*m* and then managed in a separate database. Therefore, the viewer rating calculation server 140 may identify panel information stored in the database just by using the identification information of the user device 170-*m* or the identification information of the viewer rating calculation remote apparatus 130. As described above with reference to FIG. 1, the viewer rating calculation remote apparatus 130 and the user device 170-*m* may be connected to each other through the viewer rating calculation server 140, and, thus, when the viewer rating calculation unit 260 receives first audio feature information from the viewer rating calculation remote apparatus 130, the viewer rating calculation unit 260 may read panel information of a panel connected to the viewer rating calculation remote apparatus 130 and reflect the panel information to statistics for a viewer rating. Further, the user device 170-*m* may generate panel information and then transmit the panel information to the viewer rating calculation server 140, and the viewer rating calculation server 140 may generate a viewer rating and/or statistics for the viewer rating using the received panel information and the first audio feature information received from the viewer rating calculation remote apparatus 130 connected thereto.

Further, the viewer rating calculation unit 260 may calculate the degree of viewing concentration on the basis of viewing information generated from first audio feature information received from multiple viewer rating calculation remote apparatuses 130. The degree of viewing concentration is an index indicating how much a household or personal panel concentrates on a specific channel or program or during a specific broadcast time zone. The degree of viewing concentration can be calculated by using viewing time for each channel and channel leave information obtained from viewing information of the user. That is, the viewer rating calculation unit 260 can check whether or not the user views a specific program or specific channel and viewing time for the specific program or specific channel from the viewing information, and also check whether or not the user changes a channel. Therefore, the viewer rating calculation unit 260 can check the total viewing time for the specific program/channel and whether or not or how often the user leaves the program/channel. It is possible to check a use time occupancy rate of the specific program/channel with respect to a reference time, an average number of times of leaving, an average use time, and the like on the basis of such information.

FIG. 11 is a diagram provided to explain an exemplary embodiment for calculating the degree of viewing concentration.

As illustrated in the drawing, the degree of viewing concentration can be calculated by dividing a viewing time ratio by a leave ratio. In this case, the viewing time ratio is a value obtained by dividing the sum of viewing time for a channel or program by the total viewing time. Further, the leave ratio is a value obtained by dividing the number of times of leaving the channel or program by the total number of times of leaving. As illustrated in the drawing, a viewing time ratio and a leave ratio for each channel (Channel A, Channel B, Channel C) may be calculated, and the degree of viewing concentration may be calculated on the basis of the viewing ratio and the leave ratio. In this case, it can be seen that the degree of viewing concentration for Channel C is the highest.

This calculation method is an example, and the degree of viewing concentration can be calculated by various methods according to a manager's choice.

In FIG. 3, the controller 310 of the viewer rating calculation remote apparatus 130 controls the overall operation of the viewer rating calculation remote apparatus 130, and its detailed operation will be described later.

The audio data extractor 320 may collect audio of a viewing content being broadcast or played on the set-top box (not illustrated) and the television 150 through a microphone and an audio device and extract first audio feature information.

Further, the audio data extractor 320 may collect panel reaction information indicating reactivities of viewing panels through the microphone. For example, the audio data extractor 320 may analyze the volume and kind of sounds (sounds of laughter or clapping) generated by the panels and introduced through the microphone, and the number of the sounds (corresponding to the number of the panels) and thus collect panel reaction information represented as comparable values (e.g., scalar values).

The audio data extractor 320 may transfer the panel reaction information to the controller 310, and the controller 310 may control the data communication circuit 340 to transmit the panel reaction information together with the first audio feature information to the viewer rating calculation server 140. The viewer rating calculation server 140 may calculate reactivities of the panels using the collected panel reaction information.

The audio data extractor 320 may separate and collect audio of the viewing content and audio relevant to reactions of the panels using various algorithms using frequency analysis and pattern analysis and/or a directional microphone.

Meanwhile, there has been described only an example where reactivities of the panels are collected through the microphone, but the viewer rating calculation remote apparatus 130 may further include a camera unit (not illustrated), and the camera unit (not illustrated) may generate video data of the viewing panels and analyze the kinds of movements (clapping, laughing, etc.) by analyzing the video data to collect panel reaction information represented as comparable values. That is, the viewer rating calculation remote apparatus 130 may generate information relevant to reactions of the panels using various sensors such as a microphone, a camera, and an infrared sensor.

As described above, the panel reaction information may be used to evaluate subjective emotional reactions of a viewer, such as how much the viewer enjoys or concentrates a specific channel or program, while the viewer views the specific channel or program. To this end, according to the present disclosure, various movements or sounds physically expressed by a user while viewing TV are collected through various sensors and audio data or video data generated from the collected reactions of the user are collected through the viewer rating calculation remote apparatus 130 as panel reaction information.

The local communication circuit 330 can transmit and receive data with the user device 170-$m$, and it is obvious that the local communication circuit 330 includes a communication module such as Wi-Fi, Bluetooth, ZigBee, or the like. Further, the local communication circuit 330 may measure a signal power level of the user device 170-$m$ under the control of the controller 310 and provide the signal power level to the controller 310.

The controller 310 may determine whether a panel of the user device 170-$m$ is actually viewing a viewing content. The controller 310 may control the local communication circuit 330 to measure the signal power level of the user device 170-$m$ and thus determine whether the viewing content is being actually viewed on the basis of whether or not there is a user device 170-$m$ having a signal power level equal to or higher than a threshold level. The threshold level refers to a signal level at which it is determined that the viewing content is being viewed in each household and may vary depending on a structure of each household and a network efficiency of the viewer rating calculation remote apparatus 130 and the user device 170-$m$ and thus may be initially (or periodically) set through a separate setup test process.

Further, if the user device 170-$m$ satisfies non-use conditions (e.g., no movement or non-checking of a call/message) even when the signal power level of the user device 170-$m$ is equal to or higher than the threshold level, the controller 310 may transmit a notification message through the local communication circuit 330 and then determine whether or not the viewing content is being actually viewed depending on whether or not a response thereto is received. To this end, the controller 310 may periodically collect status data (e.g., a gyro sensor value, a touch screen input value, call/message receiving data, etc.) for checking the non-use conditions with permission from the panel as a user of the user device 170-$m$.

If the controller 310 determines that the viewing content is not being actually viewed, the controller 310 may control the data communication circuit 350 not to transmit first audio feature information and/or weighting information generated by the audio data extractor 320 to the viewer rating calculation server 140.

According to another exemplary embodiment, if the controller 310 determines that the viewing content is not being actually viewed, the controller 310 may generate viewing verification information for checking whether the viewing content is actually viewed and transmit the viewing verification information with the first audio feature information and/or weighting information generated by the audio data extractor 320 to the viewer rating calculation server 140 and thus control the viewer rating calculation server 140 to perform evaluation on the first audio feature information and/or weighting information (e.g., not select or give a low weighting).

Further, the controller 310 may analyze the signal power level of the user device 170-$m$ to determine an actually viewing panel and may generate panel information about personal details of the viewing panel. The generated panel information may be transmitted to the viewer rating calculation server 140 through the data communication circuit 340.

For example, if there are multiple family members in a household corresponding to the viewer rating calculation remote apparatus 130, panel information about personal details, such as age, gender, region, etc., of a panel (a registered user or actual user) of the user device 170-$m$ having a signal power level equal to or higher than the threshold level may be generated. Herein, the number of user devices 170-$m$ having a signal power level equal to or higher than the threshold level may be used as data for supplementing or substituting the above-described information about the number of sounds in the panel reaction information.

Meanwhile, there has been described an example where the controller 310 of the viewer rating calculation remote apparatus 130 determines whether or not the panel of the user device 170-$m$ is actually viewing the viewing content, but whether or not the panel of the user device 170-$m$ is actually viewing the viewing content may be determined by the viewer rating calculation server 140. That is, as illustrated in FIG. 1, the viewer rating calculation server 140 may generate a notification message and transmit the notification message to the user device 170-$m$ connected to the viewer rating calculation remote apparatus 130, and when the user device 170-$m$ receives the notification message, the user device 170-$m$ may display the notification message, and if the user performs an operation, such as a touch, in response to the notification message, the user device 170-$m$ may transmit information about the operation to the viewer rating calculation server 140. Therefore, the viewer rating calculation server 140 may determine whether or not the panel is actually viewing the viewing content by using the received information in response to the notification message. The operation of the controller 310 of the viewer rating calculation remote apparatus 130 to determine whether or not the panel of the user device 170-*m* is actually viewing the viewing content may be performed by the viewer rating calculation server 140.

Further, the communication between the viewer rating calculation remote apparatus 130 and the viewer rating calculation server 140 has been mainly described above, but some of the operations of the viewer rating calculation remote apparatus 130 may also be performed by the user device 170-*m*. For example, the operation of the audio data extractor 320 of the viewer rating calculation remote apparatus 130 may also be performed by the user device 170-*m*. That is, the user device 170-*m* may collect panel reaction information indicating reactivities of viewing panels through the microphone. The user device 170-*m* may analyze the volume and kind of sounds (sounds of laughter or clapping) generated by the panels and introduced through the microphone, and the number of the sounds (corresponding to the number of the panels) and thus collect panel reaction information represented as comparable values (e.g., scalar values). Further, the user device 170-*m* may transmit the panel reaction information to the viewer rating calculation server 140. The viewer rating calculation server 140 may calculate a weighting on the basis of the panel reaction information and calculate a viewer rating using the weighting. Otherwise, the user device 170-*m* may generate video data of the viewing panels using a camera provided in the user device 170-*m* and analyze the kinds of movements (clapping, laughing, etc.) by analyzing the video data to collect panel reaction information represented as comparable values. Therefore, the user device 170-*m* may generate information relevant to reactions of the panels using various sensors such as a microphone, a camera, and the like.

Figure 4:
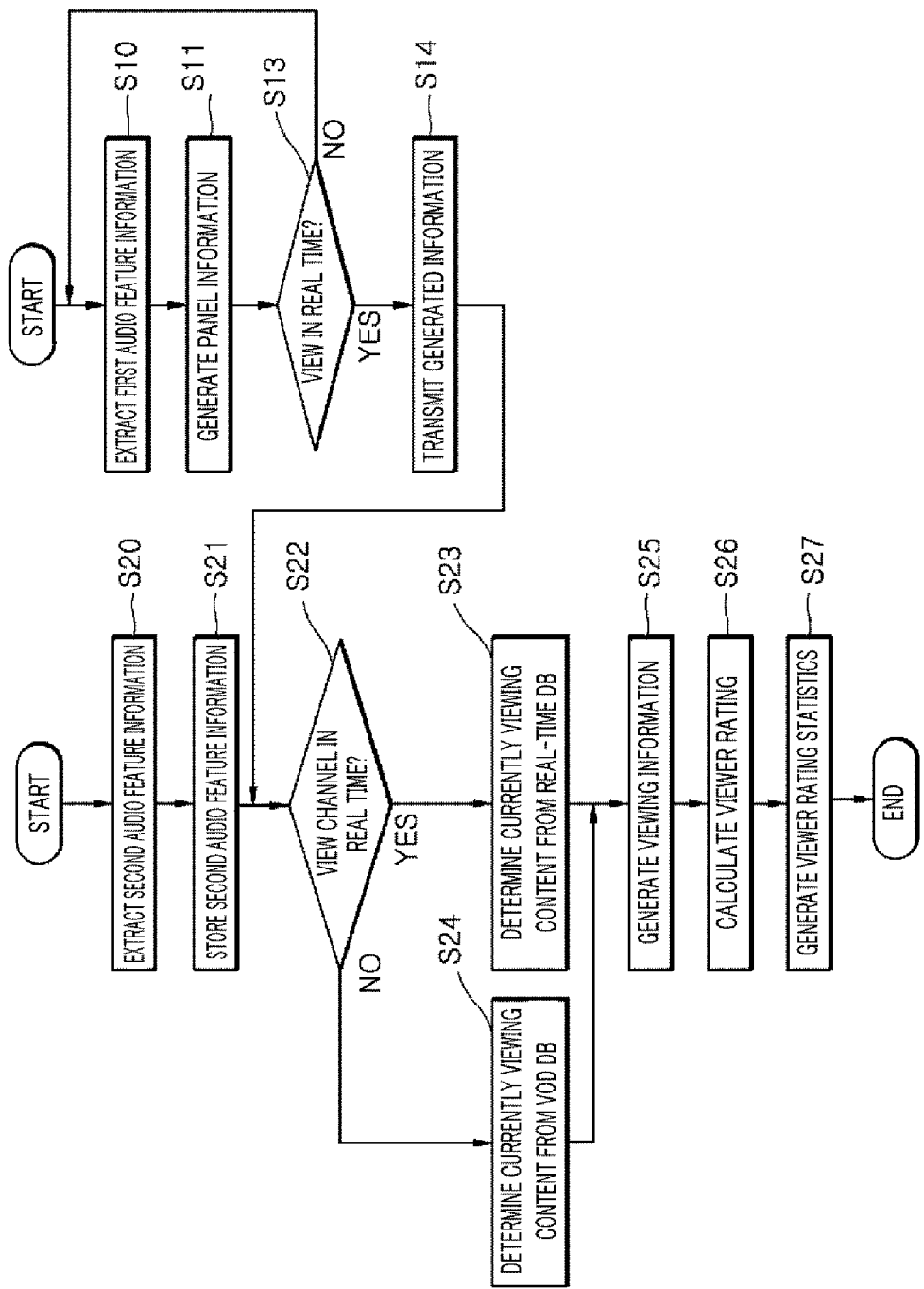
FIG. 4 is a schematic flowchart of a method for calculating a viewer rating according to an exemplary embodiment of the present disclosure.
Figure 5:
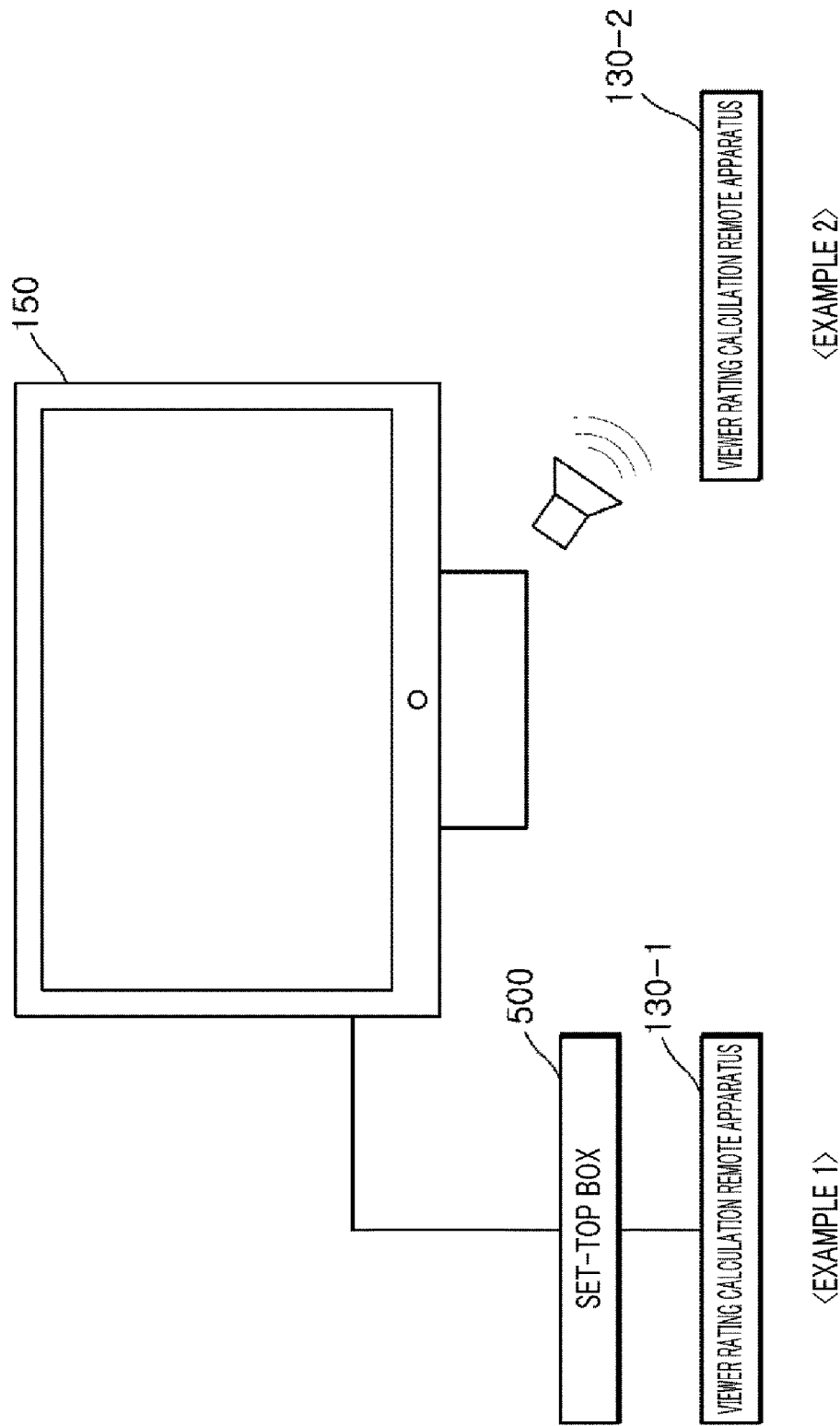
FIG. 5 is a diagram provided to explain exemplary embodiments for extracting first audio feature information.
Figure 6:
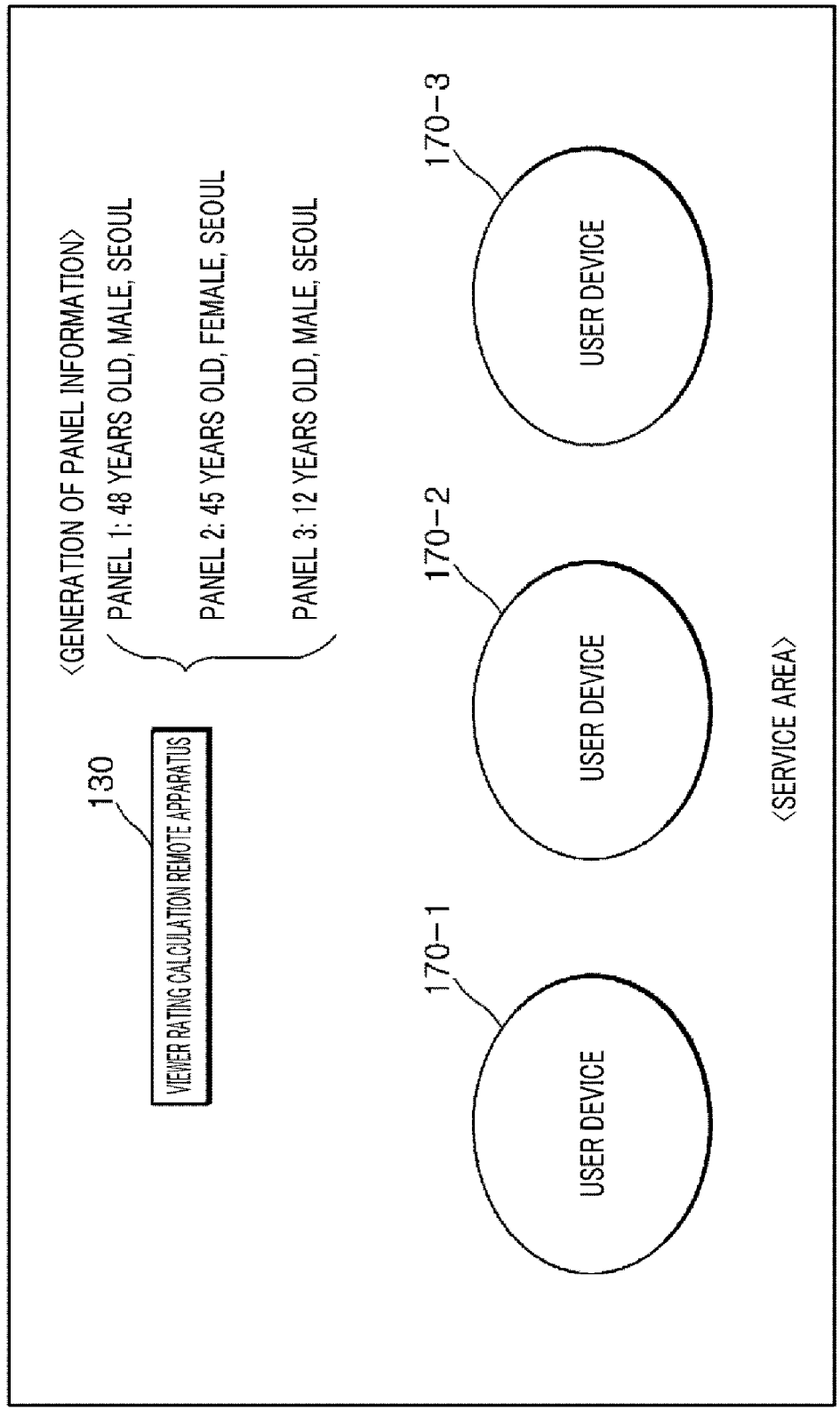
FIG. 6 is a diagram provided to explain an exemplary embodiment for generating panel information.
Figure 7:
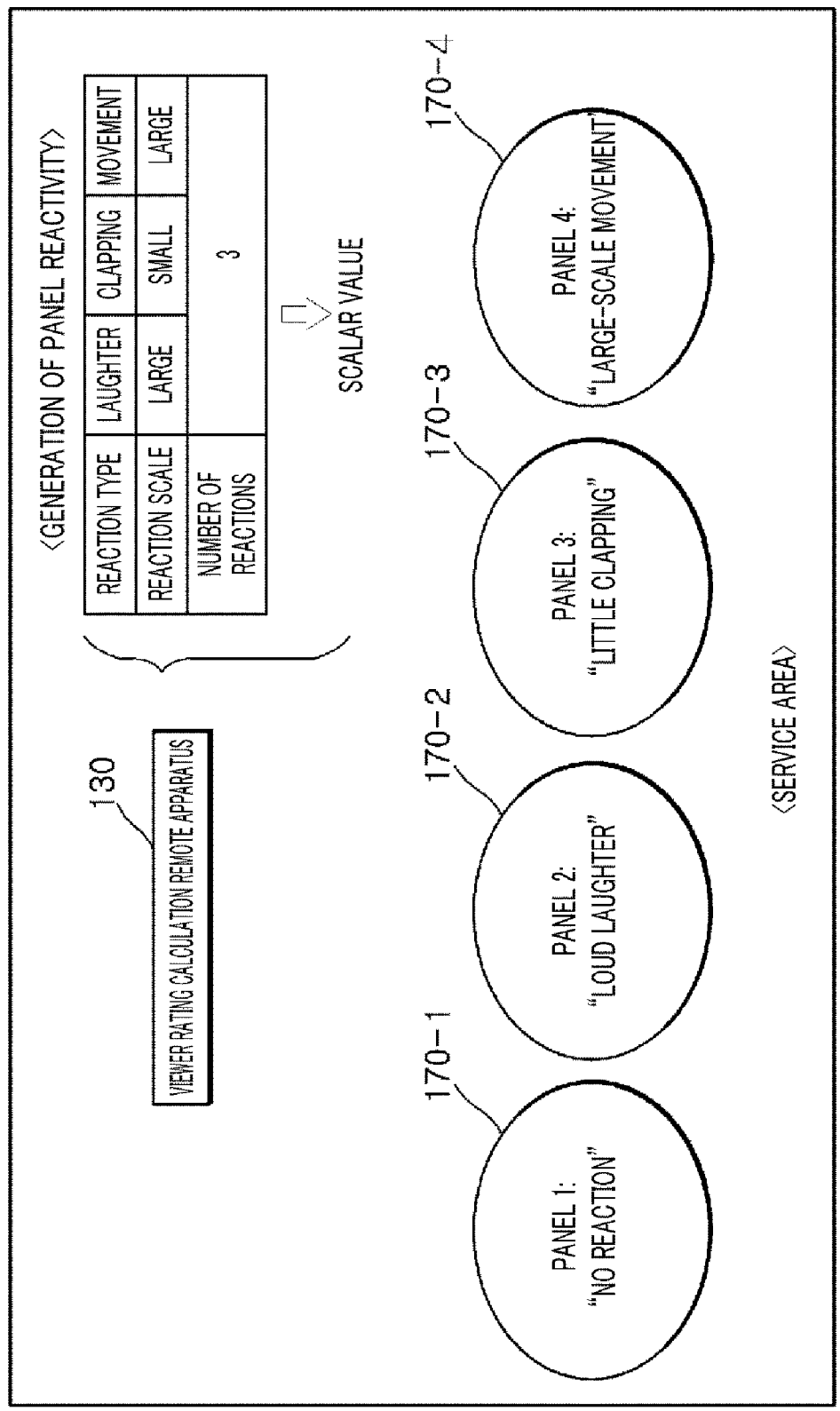
FIG. 7 is a diagram provided to explain an exemplary embodiment for generating panel reaction information and a panel reactivity.
Figure 8:
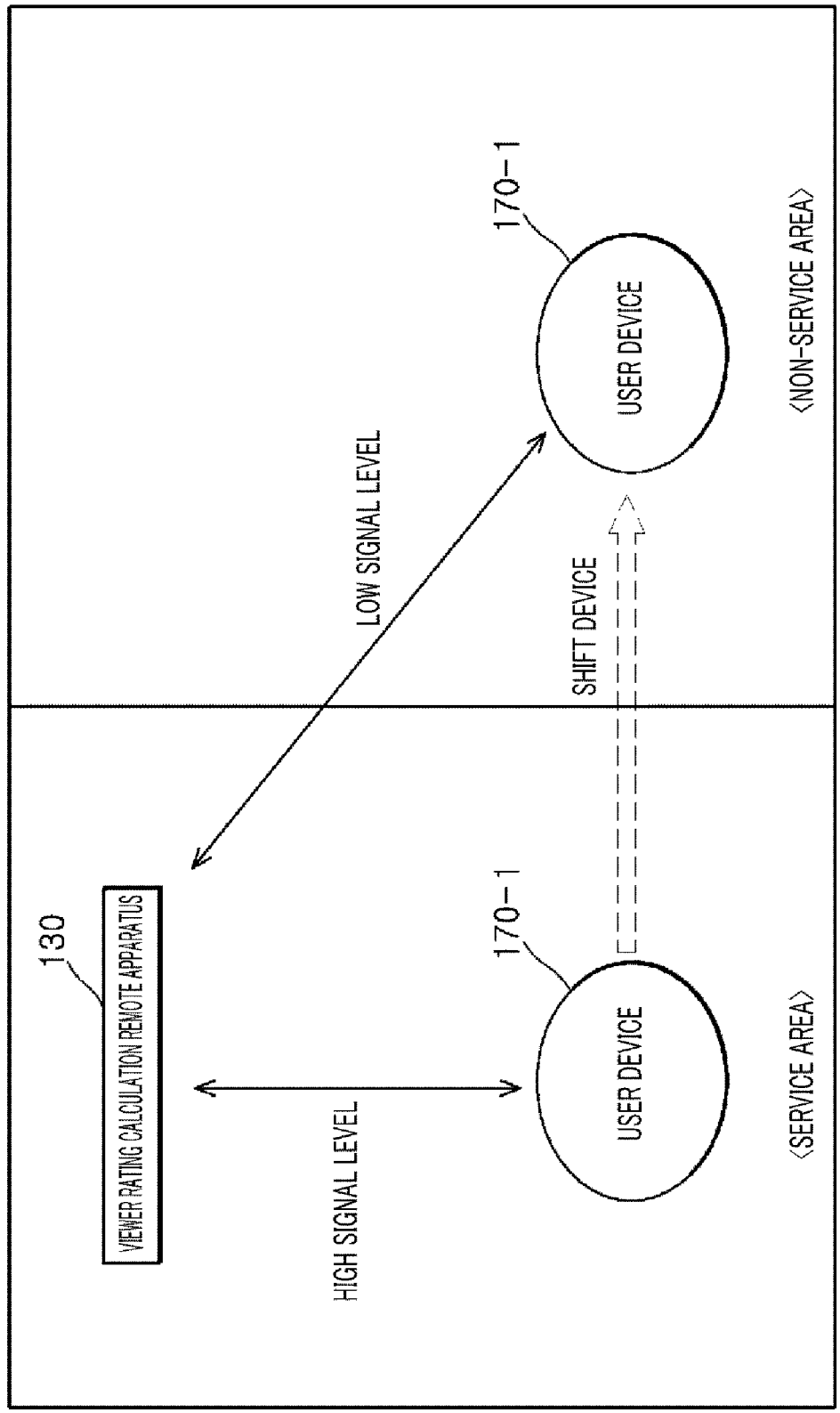
FIG. 8 is a diagram provided to explain an exemplary embodiment for verifying whether a panel actually views a content.
Figure 9:
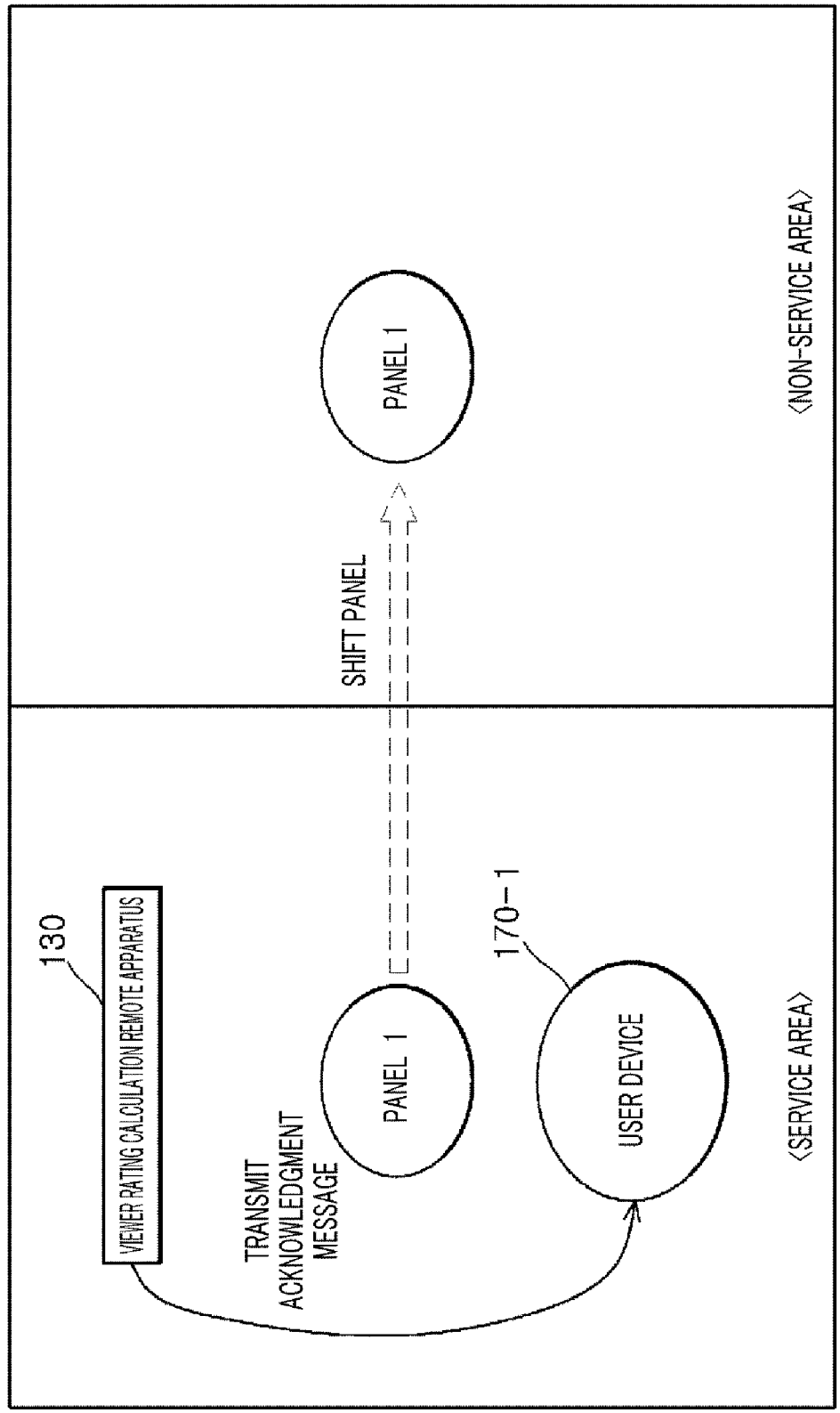
FIG. 9 and FIG. 10 are diagrams provided to explain another exemplary embodiment for verifying whether a panel actually views a content.
Figure 10:
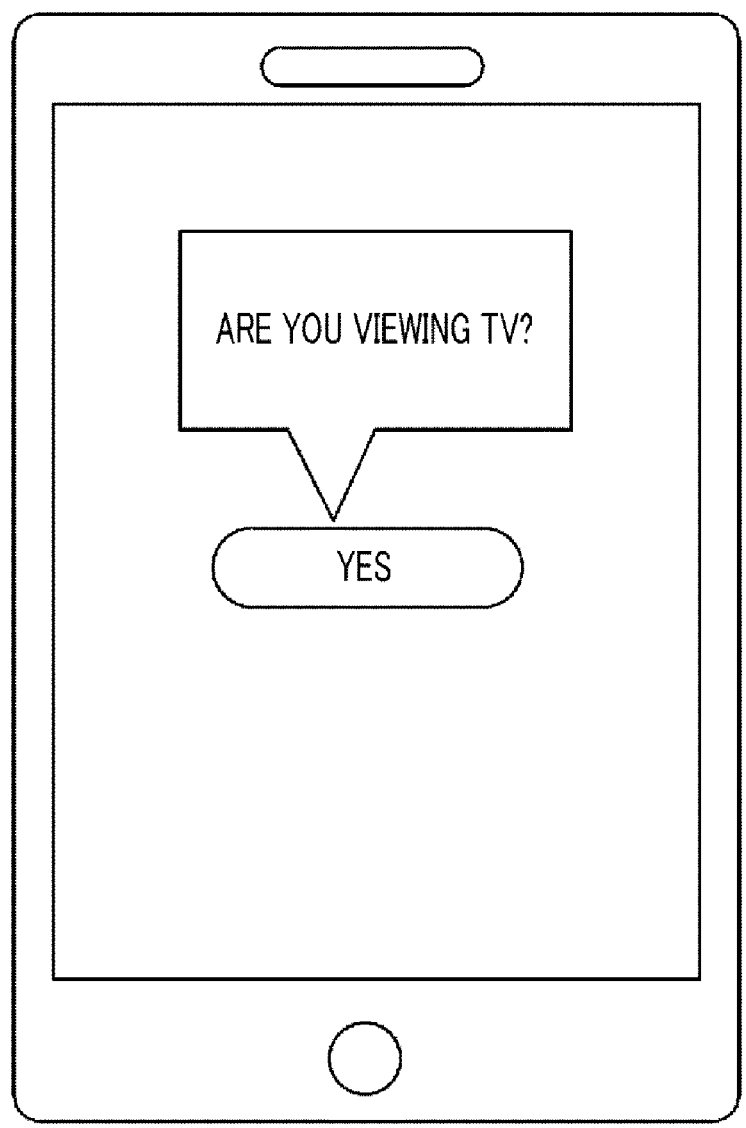

FIG. 4 is a schematic flowchart of a method for calculating a viewer rating according to an exemplary embodiment of the present disclosure. FIG. 5 is a diagram provided to explain exemplary embodiments for extracting first audio feature information. FIG. 6 is a diagram provided to explain an exemplary embodiment for generating panel information. FIG. 7 is a diagram provided to explain an exemplary embodiment for generating panel reaction information and a panel reactivity. FIG. 8 is a diagram provided to explain an exemplary embodiment for verifying whether a panel actually views a content. FIG. 9 and FIG. 10 are diagrams provided to explain another exemplary embodiment for verifying whether a panel actually views a content.

In FIG. 4, the viewer rating calculation remote apparatus 130 may process audio of a viewing content obtained through a microphone or an audio device and then generate first audio feature information (S10). An operation of generating the first audio feature information will be described with reference to FIG. 5. In "Example 1" illustrated in FIG. 5, a viewer rating calculation remote apparatus 130-1 is connected through an audio device to a set-top box 500 connected to the television 150 and configured to receive an audio signal of a viewing content directly from the set-top box 500. Therefore, the viewer rating calculation remote apparatus 130-1 may receive an audio signal of a viewing content directly from the set-top box 500 and analog-digital convert the audio signal and then perform audio fingerprinting to the digital audio signal to generate first audio feature information. Herein, the audio fingerprinting is known to those skilled in the art, and, thus, its detailed description will be omitted.

In "Example 2" illustrated in FIG. 5, a viewer rating calculation remote apparatus 130-2 is not connected to the set-top box 500 and captures audio output through a speaker of the television 150 with a microphone. Therefore, the viewer rating calculation remote apparatus 130-2 may generate an audio signal of a viewing content and analog-digital convert the audio signal through the microphone and perform audio fingerprinting to the digital audio signal to generate first audio feature information. Particularly, the viewer rating calculation remote apparatus 130-2 may be implemented as a smart phone which is equipped with a microphone and a communication module and in which an application for executing an audio fingerprinting algorithm may be installed.

Referring to FIG. 4 again, the viewer rating calculation remote apparatus 130 may analyze a signal power level of the user device 170-*m* to determine an actually viewing panel and may generate panel information about personal details of the viewing panel (S11). In FIG. 6, if an area where the user device 170-*m* has a signal power level equal to or higher than a threshold level with respect to the viewer rating calculation remote apparatus 130 is defined as a service area, it is assumed that there are multiple panels (registered users or actual users) and user devices 170-1 to 170-3 in the service area. The viewer rating calculation remote apparatus 130 may generate panel information about personal details, such as age (48 years old, 45 years old, 12 years old), gender (male, female, male), region (Seoul, Seoul, Seoul), of the panels of the respective user devices 170-1 to 170-3. Meanwhile, the panel information may also be generated by the user device 170-*m* and directly transmitted from the viewer rating calculation server 140 as described above. Therefore, devices that generate the panel information do not limit the scope of the present disclosure.

Referring to FIG. 4 again, the viewer rating calculation remote apparatus 130 may determine whether or not a panel is actually viewing a viewing content (S13). If the viewer rating calculation remote apparatus 130 determines that the panel is actually viewing the viewing content (YES in S13), the viewer rating calculation remote apparatus 130 may transmit first audio feature information and the panel information to the viewer rating calculation server 140. Further, as described above, if a panel reactivity is generated by the viewer rating calculation server 140, panel reaction information collected by the viewer rating calculation remote apparatus 130 may be transmitted to the viewer rating calculation server 140.

If the viewer rating calculation remote apparatus 130 determines that the panel is not actually viewing the viewing content (NO in S13), the viewer rating calculation remote apparatus 130 may not transmit the first audio feature information, the panel information, or the panel reaction information to the viewer rating calculation server 140.

According to an exemplary embodiment, if the viewer rating calculation remote apparatus 130 determines that the panel is not actually viewing the viewing content, the viewer rating calculation remote apparatus 130 may not generate the first audio feature information, the panel information, or the panel reaction information until specific unlock conditions (e.g., an increase of a signal level of the user device 170-1 to be equal to or higher than the threshold level, detection of a movement of the device, checking a call/message, or a touch in response to a notification message) are satisfied.

In FIG. 8, it is assumed that the user device 170-1 present in the service area is shifted to a non-service area (where the user device 170-m cannot have a signal power level equal to or higher than the threshold level with respect to the viewer rating calculation remote apparatus 130). The viewer rating calculation remote apparatus 130 measures a signal power level of the user device 170-1 and then determines whether there is a user device 170-m having a signal power level equal to or higher than the threshold level. Before the device is shifted, the signal level is higher than the threshold level, and, thus, the viewer rating calculation remote apparatus 130 may determine that a panel corresponding to the user device 170-1 is actually viewing a viewing content.

However, after the device is shifted, the signal level is lower than the threshold level, and, thus, the viewer rating calculation remote apparatus 130 may determine that the panel corresponding to the user device 170-1 is not actually viewing the viewing content. By applying the life pattern of modern people who tend to carry their mobile phone with them all the time even at home, a case where the user device 170-1 is not present in the service area is regarded as a case where the panel is not viewing the viewing content.

Further, in FIG. 9, it is assumed that the user device 170-1 and a panel 1 have been present in the service area but only the panel 1 is shifted to the non-service area. The viewer rating calculation remote apparatus 130 measures a signal power level of the user device 170-1 and the signal level is higher than the threshold level, and, thus, the viewer rating calculation remote apparatus 130 may first determine that the panel corresponding to the user device 170-1 is actually viewing the viewing content.

However, if the user device 170-1 satisfies the non-use conditions (e.g., no movement or non-checking of a call/message) even when the signal power level of the user device 170-1 is equal to or higher than the threshold level, the viewer rating calculation remote apparatus 130 may transmit a notification message through the local communication circuit 330 and then determine whether or not the viewing content is being actually viewed depending on whether or not a response thereto is received. To this end, the controller 310 may periodically collect status data (e.g., a gyro sensor value, a touch screen input value, call/message receiving data, etc.) for checking the non-use conditions with permission from the panel as a user of the user device 170-1.

FIG. 10 illustrates an example of the notification message, and if the panel 1 is present in the service area and checks the notification message displayed on a screen of the user device 170-1 and then performs an operation to generate a response message (e.g., if the user touches "YES" displayed on the user device 170-1 as illustrated in FIG. 10), the viewer rating calculation remote apparatus 130 may determine that the panel corresponding to the user device 170-1 is actually viewing the viewing content.

However, if the panel 1 is present in the non-service area and cannot check the notification message displayed on the screen of the user device 170-1 and thus does not perform an operation to generate a response message (if the panel 1 does not touch "YES" in FIG. 10), the viewer rating calculation remote apparatus 130 may determine that the panel corresponding to the user device 170-1 is not actually viewing the viewing content.

That is, the reason for checking whether the panel is actually viewing the viewing content in the process S13 illustrated in FIG. 4 is to accurately calculate a viewer rating just by collecting data on the actually viewing panel since the television 150 may be turned on without being viewed by the panel and data of this household may be used to calculate a viewer rating, resulting in an inaccurate calculation of a viewer rating.

The viewer rating calculation server 140 extracts second audio feature information using a broadcast content received from the broadcast service provider 110 connected thereto through the broadcasting network 120 by a predetermined method (S20).

The viewer rating calculation server 140 may store second audio feature information of a broadcast content which is currently broadcast in the real-time broadcast database and second audio feature information of a broadcast content which is already ended in the VOD broadcast database (S21).

Meanwhile, the viewer rating calculation server 140 may compare first audio feature information received from the viewer rating calculation remote apparatus 130 with second audio feature information previously stored in the real-time broadcast database to determine a content being currently viewed on the television 150 corresponding to the viewer rating calculation remote apparatus 130 (S22).

If the first audio feature information is identical to the second audio feature information stored in the real-time broadcast database (YES in S22), the viewer rating calculation server 140 may determine a broadcast content corresponding to the identical second audio feature information as a currently viewing content (S23).

If the first audio feature information is not identical to the second audio feature information stored in the real-time broadcast database (NO in S22), the viewer rating calculation server 140 may compare the first audio feature information with second audio feature information stored in the VOD broadcast database and determine a broadcast content corresponding to the identical second audio feature information as a currently viewing content (S24).

The viewer rating calculation server 140 may generate viewing information as a result of determination of a currently viewing content (S25). The viewing information may include personal information of the user of the viewer rating calculation remote apparatus 130, time information, channel information of the broadcast content, title information of the broadcast content, and the like.

Meanwhile, the viewer rating calculation server 140 may calculate a viewer rating of each broadcast content in real time on the basis of viewing information generated from first audio feature information received from multiple viewer rating calculation remote apparatuses 130 (S26).

Further, the viewer rating calculation server 140 may calculate a panel reactivity indicating the degree of reaction of panels to each of viewed channels or programs using panel reaction information received from the viewer rating calculation remote apparatus 130.

FIG. 7 is a diagram provided to explain an exemplary embodiment for generating panel reaction information and a panel reactivity. For example, if panel reaction information indicating that there are many panels viewing a TV or there is an increase in volume of sounds of the panels' laughter or clapping is received, a panel reactivity to the corresponding channel or program can be calculated. As illustrated in the drawing, it is assumed that the panel 1 does not show any reaction, a panel 2 bursts into a loud laughter, a panel 3 gives a little clapping, and a panel 4 shows a large-scale movement. These reactions of the panels are collected and transmitted as panel reaction information. Further, the viewer rating calculation server 140 may recognize the kinds of sounds (laughter or clapping), volume of sounds (loud or quiet), number of sounds, and scale of movements (large or small) on the basis of the panel reaction information and calculate a panel reactivity on the basis of the number of collected pieces of reaction information. In the drawing, a total of 3 pieces of panel reaction information are collected from a total of the 4 panels, and, thus, a panel reactivity may be calculated as 3. In this case, a weighting may be given to each kind of reaction considering a scale of reaction. A large-scale reaction is given a high weighting and a small-scale reaction is given a low weighting to calculate a panel reactivity.

Further, the viewer rating calculation server 140 may calculate the degree of viewing concentration on the basis of the viewing information received from the multiple viewer rating calculation remote apparatuses 130, and details thereof are the same as described above with reference to FIG. 11.

Then, the viewer rating calculation server 140 may generate statistics for a viewer rating by reflecting panel information about a panel's personal details (e.g., information about age, gender, and region of a panel) received from the viewer rating calculation remote apparatus 130 (S27). That is, the viewer rating calculation unit 260 may generate not only a simple viewer rating but also statistics for a viewer rating applied with a weighting depending on specific personal criteria such as age, gender, region, and the like by using the panel information. Further, if the number of panels classified by a predetermined classification criterion does not match with a demographic ratio, the viewer rating calculation unit 260 may give a weighting for compensating for a difference to more accurately calculate a viewer rating on the basis of panel information.

The viewer rating calculation server 140 may provide a real-time viewer rating, an average viewer rating, a cumulative viewer rating (e.g., a cumulative viewer rating for 1 month), and viewer rating statistics calculated by the above-described method to the broadcast service provider 110 and/or the viewer rating calculation remote apparatus 130 and may provide a separate viewing notification service.

For example, viewing notification information generated for each individual (e.g., information indicating that a certain regular broadcast has been viewed every week in a recent month but not viewed this week and a broadcast content for this week is currently rebroadcast) may be provided to the viewer rating calculation remote apparatus 130, and the viewer rating calculation remote apparatus 130 may provide a new viewing notification message to the corresponding user device 170-*m*.

Therefore, the viewer rating calculation system 100 according to an exemplary embodiment of the present disclosure can survey all of the viewer rating calculation remote apparatuses 130 equipped with an application for viewer rating in a simpler manner than a conventional system that surveys limited samples for viewer rating, and, thus, the viewer rating calculation system 100 can calculate a very accurate viewer rating.

Further, the viewer rating calculation system 100 can collect data for viewer rating calculation in real time and provide various viewer ratings in real time, departing from a conventional method of collecting data for viewer rating calculation in a specific time zone. Furthermore, the viewer rating calculation system 100 can calculate a practical viewer rating by continuously checking who is viewing and whether or not viewing actually occurs as compared with a conventional system that cannot identify who is currently viewing in each household.

Finally, the viewer rating calculation system 100 can provide a cumulative viewer rating for each broadcast content provided through a VOD service to be used as data for supplementing a real-time viewer rating, departing from a conventional method which cannot provide data on a cumulative viewer rating.

The method for calculating a viewer rating in accordance with the embodiments of the present disclosure as mentioned above may be implemented in the form of computer readable codes on a computer readable media. The computer readable media may include any kinds of storage media on which data that can be decoded by a computer system is stored. For example, the computer storage media may include ROM (Read Only Memory), RAM (Random Access Memory), a magnetic tape, a flash memory, optical data storage and the like. Further, the computer readable storage media can be stored and carried out as codes that are distributed in a computer system connected to a computer network and are readable in a distributed manner. Therefore, the server communication unit, the audio feature information extraction unit, the viewing content identification unit and the viewer rating calculation unit are implemented according to the execution of the viewer rating calculation codes on the computer readable media of the viewer rating calculation server.

In addition, while the aforementioned description has been made with reference to the preferred embodiments of the present disclosure, it will be appreciated to those skilled in the art that the present can make various modifications and changes within the range without departing from the spirit and scope claimed in following claims.

We claim:

1. A viewer rating calculation server comprising:
   a server communication unit receives first audio feature information extracted by a viewer rating calculation remote apparatus from viewed content;
   an audio feature information extraction unit extracts second audio feature information of a broadcast content received from at least one broadcast service provider;
   a viewing content identification unit generates viewing information as a result of determination of currently viewed content by comparing the extracted first audio feature information with the second audio feature information, wherein the comparing includes: comparing the extracted first audio feature information with extracted second audio feature information stored in a real-time broadcast database before a predetermined time, and
   in response to determination that the extracted first audio feature information is not identical with extracted second audio feature information stored in the real time database, comparing the first extracted audio feature information with extracted second audio feature information stored in a video-on-demand (VOD) broadcast database; and
   a viewer rating calculation unit:
   calculates a viewer rating of respective broadcast content in real time on a basis of the generated viewing information,
   calculates a degree of viewing concentration of viewers on a specific reference channel or program or during a specific time period by using viewing time for each channel and channel change information obtained from the viewing information, wherein the degree of viewing concentration is calculated by dividing a viewing time ratio by a leave ratio,
   generates and transmits a notification message to a user device, for display by the user device, when the user device connected to the viewer rating calculation remote apparatus is determined to satisfy non-use conditions according to power level signal and activity of the user device, receives information regarding a user operation in response to the notification from the user device, and determines a panel is actually viewing the viewing content by using the received information regarding the user operation in response to the notification message.

2. The viewer rating calculation server of claim 1, further comprising: a database unit including the real-time broadcast database configured to store second audio feature information of a broadcast content which is currently broadcast and the VOD broadcast database configured to store second audio feature information of a broadcast content which is already ended.

3. The viewer rating calculation server of claim 1, wherein the viewing content identification unit compares the extracted first audio feature information with the extracted second audio feature information stored in the real-time broadcast database, and in response to the extracted first audio feature information is identical to the extracted second audio feature information stored in the real-time broadcast database, the viewing content identification unit determines a broadcast content corresponding to the identical extracted second audio feature information as a currently viewing content.

4. The viewer rating calculation server of claim 1, wherein the viewer rating calculation unit generates statistics for the viewer rating by reflecting panel information about a panel's personal details received from the viewer rating calculation remote apparatus.

5. The viewer rating calculation server of claim 1, wherein the viewer rating calculation unit generates statistics for the viewer rating by reflecting panel information about a panel's personal details, and the panel information is received from the user device corresponding to the viewer rating calculation remote apparatus or previously stored in the viewer rating calculation server.

6. The viewer rating calculation server of claim 1, wherein, if a ratio of the number of panels constituting each panel group classified by a predetermined classification criterion and the total number of panels does not match with a demographic ratio corresponding to the classification criterion, the viewer rating calculation unit gives a weighting for compensating for a difference to each panel group to calculate a viewer rating.

7. The viewer rating calculation server of claim 1, wherein the viewer rating calculation unit calculates a panel reactivity on a basis of panel reaction information including audio data or video data generated from reactions of a viewer to a viewing content and collected through the viewer rating calculation remote apparatus or the user device corresponding thereto.

8. A method for calculating a viewer rating, comprising:

receiving, by a server communication unit, first audio feature information extracted by a viewer rating calculation remote apparatus from viewed content;

extracting, by an audio feature information extraction unit, second audio feature information of a broadcast content received from at least one broadcast service provider;

generating, by a viewing content identification unit, viewing information as a result of determination of currently viewed content by comparing the extracted first audio feature information with the extracted second audio feature information wherein the comparing includes:

comparing the extracted first audio feature information with extracted second audio feature information stored in a real-time broadcast database before a predetermined time, and in response to determination that the extracted first audio feature information is not identical with extracted second audio feature information stored in the real-time database, comparing the first extracted audio feature information with extracted second audio feature information stored in a video-on-demand (VOD) broadcast database;

calculating, by a viewer rating calculation unit, a viewer rating of respective broadcast content in real time on a basis of the generated viewing information;

calculating, by the viewer rating calculation unit, a degree of viewing concentration of viewers on a specific reference channel or program or during a specific time period by using viewing time for each channel and channel change information obtained from the viewing information, wherein the degree of viewing concentration is calculated by dividing a viewing time ratio by a leave ratio, generating and transmitting, by the viewer rating calculation unit, a notification message to a user device, for display by the user device, when the user device connected to the viewer rating calculation remote apparatus is determined to satisfy non-use conditions according to power level signal and activity of the user device, receiving, by the viewer rating calculation unit, information regarding a user operation in response to the notification message, from the user device, and determining, by the viewer rating calculation unit, whether or not a panel is actually viewing the viewing content by using the received information regarding the user operation in response to the notification message.

9. The method for calculating a viewer rating of claim 8, wherein the generating of viewing information includes:

comparing the extracted first audio feature information with the extracted second audio feature information stored in the real-time broadcast database; and in response to the extracted first audio feature information is identical to the extracted second audio feature information stored in the real-time broadcast database as a result of the comparing, determining a broadcast content corresponding to the identical extracted second audio feature information as a currently viewing content.

10. The method for calculating a viewer rating of claim 8, wherein the calculating of a viewer rating in real time includes generating statistics for the viewer rating by reflecting panel information about a panel's personal details received from the viewer rating calculation remote apparatus.

11. The method for calculating a viewer rating of claim 8, wherein the calculating of a viewer rating in real time includes generating statistics for the viewer rating by reflecting panel information about a panel's personal details, and the panel information is received from the user device corresponding to the viewer rating calculation remote apparatus or previously stored in a viewer rating calculation server.

12. The method for calculating a viewer rating of claim 8, wherein, if a ratio of the number of panels constituting each panel group classified by a predetermined classification criterion and the total number of panels does not match with a demographic ratio corresponding to the classification criterion, the calculating of a viewer rating in real time includes giving a weighting for compensating for a difference to each panel group to calculate a viewer rating.

13. The method for calculating a viewer rating of claim 8, further comprising:

calculating a panel reactivity, wherein the panel reactivity is an index indicating the degree of reaction of panels to a viewed channel or program and is calculated on a basis of panel reaction information including audio data or video data generated from a viewer's reaction to a viewing content and collected through the viewer rating calculation remote apparatus or the user device corresponding to the viewer rating calculation remote apparatus.

14. The method for calculating a viewer rating of claim 8, further comprising:

calculating the degree of viewing concentration, wherein the degree of viewing concentration indicates the degree of concentration of a user on a specific reference channel or program or during a specific time zone by using viewing time for each channel and channel leave information obtained from the viewing information.

* * * * *